United States Patent [19]

Baror et al.

[11] Patent Number: 4,926,323

[45] Date of Patent: May 15, 1990

[54] STREAMLINED INSTRUCTION PROCESSOR

[75] Inventors: Gigy Baror, Austin, Tex.; Brian W. Case, Sunnyvale, Calif.; Rod G. Fleck, Munich, Fed. Rep. of Germany; Philip M. Freidin, Sunnyvale, Calif.; Smeeta Gupta, Saratoga, Calif.; William M. Johnson, San Jose, Calif.; Cheng-Gang Kong, Saratoga, Calif.; Ole H. Moller, Lyngby, Denmark; Timothy A. Olson, Sunnyvale; David I. Sorensen, San Jose, both of Calif.

[73] Assignee: Advanced Micro Devices, Inc., Sunnyvale, Calif.

[21] Appl. No.: 163,917

[22] Filed: Mar. 3, 1988

[51] Int. Cl.$^5$ ............................ G06F 9/40; G06F 9/00
[52] U.S. Cl. ......................... 364/200; 364/232.23; 364/231.8; 364/243.41
[58] Field of Search ... 364/200 MS File, 900 MS FIle

[56] References Cited

U.S. PATENT DOCUMENTS

| | | | |
|---|---|---|---|
| 4,179,736 | 12/1979 | Wilhite | 364/200 |
| 4,392,200 | 7/1983 | Arulpragasom et al. | 364/200 |
| 4,514,660 | 6/1986 | Guenthner et al. | 364/200 |
| 4,583,165 | 4/1986 | Rosenfeld | 364/200 |
| 4,594,655 | 6/1986 | Hao et al. | 364/200 |
| 4,594,659 | 6/1986 | Guenthner et al. | 364/200 |
| 4,695,943 | 9/1987 | Keeley et al. | 364/200 |
| 4,734,852 | 3/1988 | Johnson et al. | 364/200 |

OTHER PUBLICATIONS

Geo. Radin, "The 801 Minicomputer," *Computer Architecture News* (U.S.A.), vol. 10, No. 2, pp. 39–47, Mar. 1982.
J. Hennessy et al., "Hardware/Software Tradeoffs for Increased Performance," Computer Architecture News (U.S.A.) vol. 10, No. 2, pp. 2–11, Mar. 1982.
D. A. Patterson et al., "A VLSI RISC," *Computer* (U.S.A.) vol. 15, No. 9, pp. 8–21, Sep. 1982.
D. E. Waldecker, et al., "Romp MMU Technology Introduction," *IBMAT Personal Computer Technology*, Form #SA23-1507, publ. 1986, pp. 44–47.
P. D. Hester et al., "The IBM RT PC Romp & Memory Management Unit Architecture," ibid., pp. 48–56.
D. E. Waldecker et al., "Romp MMU Implementation," ibid., pp. 57–65.

Primary Examiner—Gareth D. Shaw
Assistant Examiner—Kevin A. Kriess
Attorney, Agent, or Firm—Fliesler, Dubb, Meyer & Lovejoy

[57] ABSTRACT

A streamlined instruction processor processes data in response to a program composed of prespecified instructions in pipeline cycles. The processor comprises an instruction fetch unit, including an instruction interface adapted for connection to an instruction memory and for fetching instructions from the instruction memory. The instruction fetch unit includes an instruction prefetch buffer coupled to the instruction interface for buffering a sequence of instructions supplied to the instruction interface. A branch target cache is coupled with the prefetch buffer for storing sets of instructions retrieved from a corresponding set of locations in the instruction memory, having sequential instruction addresses. The first instruction in each such set is a branch target instruction in the program.

In addition, an execution unit including a data interface adapted for connection to the data memory, executes the instructions in pipeline cycles. The execution unit includes a storage facility, coupled to the data interface, for storing data in a file of data locations identified by file addresses. The storage facility includes at least two read ports and one write port operable in response to file addresses. An addressing unit coupled to receive the instructions from the instruction register, supplies the file addresses to the read ports and the write port under program control. In addition, the addressing unit is operable in response to a stack pointer providing dynamic allocation of the file of data locations to processes within the program.

A memory management unit is coupled to the data interface. The memory management unit includes an address interface adapted for connection to the data memory and the instruction memory for supplying instruction addresses to the instruction memory and data addresses to the data memory, in a simple single access mode, a pipeline mode and a burst mode.

40 Claims, 13 Drawing Sheets

| ABSOLUTE REG # | GENERAL-PURPOSE REGISTER |
|---|---|
| 0 | INDIRECT POINTER ACCESS |
| 1 | STACK POINTER |

| 2 THRU 63 | NOT IMPLEMENTED |
|---|---|

GLOBAL REGISTERS

| 64 | GLOBAL REGISTER 64 |
|---|---|
| 65 | GLOBAL REGISTER 65 |
| 66 | GLOBAL REGISTER 66 |
| ⋮ | ⋮ |
| 126 | GLOBAL REGISTER 126 |
| 127 | GLOBAL REGISTER 127 |

LOCAL REGISTERS

| 128 | LOCAL REGISTER 125 |
|---|---|
| 129 | LOCAL REGISTER 126 |
| 130 | LOCAL REGISTER 127 |
| 131 | LOCAL REGISTER 0 | ← STACK POINTER =131
| 132 | LOCAL REGISTER 1 |
| ⋮ | ⋮ |
| 254 | LOCAL REGISTER 123 |
| 255 | LOCAL REGISTER 124 |

FIG.-9

| REGISTER BANK PROTECT REGISTER BIT | ABSOLUTE REGISTER-NUMBERS | GENERAL-PURPOSE REGISTERS |
|---|---|---|
| 0 | 2 THRU 15 | BANK 0 (UNIMPLEMENTED) |
| 1 | 16 THRU 31 | BANK 1 (UNIMPLEMENTED) |
| 2 | 32 THRU 47 | BANK 2 (UNIMPLEMENTED) |
| 3 | 48 THRU 63 | BANK 3 (UNIMPLEMENTED) |
| 4 | 64 THRU 79 | BANK 4 |
| 5 | 80 THRU 95 | BANK 5 |
| 6 | 96 THRU 111 | BANK 6 |
| 7 | 112 THRU 127 | BANK 7 |
| 8 | 128 THRU 143 | BANK 8 |
| 9 | 144 THRU 159 | BANK 9 |
| 10 | 160 THRU 175 | BANK 10 |
| 11 | 176 THRU 191 | BANK 11 |
| 12 | 192 THRU 207 | BANK 12 |
| 13 | 208 THRU 223 | BANK 13 |
| 14 | 224 THRU 239 | BANK 14 |
| 15 | 240 THRU 255 | BANK 15 |

STREAMLINED INSTRUCTION PROCESSOR

CROSS-REFERENCES TO RELATED APPLICATIONS

The present application is related to copending U.S. patent applications entitled:

(1) GENERA-PURPOSE REGISTER FILE OTIMIZED FOR INTRAPROCEDURAL REGISTER ALLOCATION, PROCEDURE CALLS, AND MULTITASKING PERFORMANCE, invented by Brian W. Case et al, Ser. No. 06/771,311, filed Aug. 30, 1985 now U.S. Pat. No. 4,777,588 issued Oct. 11, 1988;)

(2) COMPUTER CONTROL PROVIDING SINGLE-CYCLE BRANCHING, invented by Brian W. Case et al, Ser. No. 06,771,327, filed Aug. 30, 1985, now U.S. Pat. No. 4.777,587 issued Oct. 11, 1988;

(3) MECHANISM FOR PERFORMING DATA REFERENCES TO STORAGE IN PARALLEL WITH INSTRUCTION EXECUTION ON A REDUCED INSTRUCTION-SET PROCESSOR, invented by Brian W. Case et al, Ser. No. 06/77,1,435, filed Aug. 30, 1985, now U.S. Pat. No. 4,734,852 issued Mar. 29, 1988, (4) METHODS AND APPARATUS FOR OPTIMIZING INSTRUCTION PROCESSING IN COMPUTER SYSTEMS EMPLOYING A COMBINATION OF INSTRUCTION CACHE AND HIGH SPEED CONSECUTIVE TRANSFER MEMORIES, invented by Philip Freidin, Ser. No 06/936,193, filed Dec. 1, 1986;

(5) METHODS AND APPARATUS FOR ACHIEVING A HIGH PERFORMANCE SYSTEM INTERFACE FOR A REDUCED INSTRUCTION SET COMPUTER SYSTEM, invented by William Michael Johnson et al., Ser. No 07/012,226, filed Feb. 9, 1987 now U.S. Pat. No. 4,851,990 issued June 25, 1989.

The related applications were owned at the time of invention and are currently owned by the same assignee as the present invention. They are incorporated by reference as is fully set forth herein.

BACKGROUND OF THE INVENTION

1. Field of the Invention

The present invention relates to pipelined data processing systems. In particular, the present invention provides an architecture for optimizing the flow of data and instructions in a pipelined microprocessor.

2. Description of Related Art

High-speed data processing systems are often implemented using a pipeline architecture in order to support high processing rates. Instruction processing is overlapped with a different instruction in each of a plurality of pipeline stages. Each stage is adapted for completion within one instruction cycle, so that the results from execution of one instruction is posted every cycle when the pipeline is full. By maintaining a full pipeline, the execution rate of the processor will approach one instruction per cycle.

Considerable development has been directed to reducing the cycle time for pipelined data processing systems. The performance of the pipelined processor, therefore, is becoming more and more dependent on the flow of instructions and data into the system to keep the pipeline full. An instruction and the operand data upon which it will execute, must be provided to the processing unit in time with the pipeline in order to keep the pipeline full. Because of the short cycle time of advanced processors, the time it takes to fetch instructions or operand data from external storage media is often longer than one cycle. Therefore, the architecture of the microprocessor must be optimized to maintain this flow of instructions and data at a high rate to minimize stalls in the pipeline due to fetches and stores.

The flow of instructions in prior art systems is maintained by providing storage devices that are able to generate a sequence of instructions automatically for supply to the processor. This relieves the processor of the burden of generating an address for each instruction to be processed, thereby allowing the supply of instructions to the pipeline to be carried out as a background task that does not burden the pipeline. However, when programs branch to other sequences of instructions, the processor must communicate with a sequential transfer device and provide a new starting address. Thus, branches in the instruction stream may cause instances in which the pipeline of the processor will be stalled, waiting until the sequential transfer device can start up a new flow of instructions.

The flow of operand data in to the processor is another source for pipeline stalls. When data required for execution of a given instruction is stored in a device external to the processor, the fetch operation can take several cycles. Prior art systems have provided a register file in the execution unit of a data processing system in which operand data can be stored. However, the contents of the register file are required to be changed from process to process. Therefore, the time involved in swapping the contents of the register file when control of the pipeline changes from one process to another can cause degradation of performance due to sequences of external fetches.

In addition, the ability to keep a pipeline full in a given data processing system is influenced by contention for buses used to transfer instructions, data and addresses between the processor and external storage devices. Various bus architectures exist. For instance, a separate bus could be provided for each path. For single chip processors, however, the number of input/output pins required for separate buses is excessive. Further, the interfaces required for all of the buses would be wasteful of chip space. Accordingly, in microprocessors implemented on a single chip, a variety of bus-sharing architectures is used, all of which cause performance degradation in the processor because of competing uses An architecture that optimizes the flow of data and instructions into a pipelined processing unit and minimizes the amount of external fetches required to supply instructions and operand data to the processing unit, is desirable However, a combination of processor features which optimizes the flow of instructions and data must be viewed as a total system. A particular feature which, considered alone, increases one aspect of processor performance, may actually decrease the performance of the total system, because of the burden which it places elsewhere in the system.

SUMMARY OF THE INVENTION

The present invention provides an elegant architecture for a data processing system optimized to keep the pipeline full The architecture supports execution of instructions such that the average number of cycles per instruction approaches one.

The architecture according to the present invention, is based on a combination of a unique system interface, register file and branch target cache. The system interface provides separate address, instruction and data buses. The instruction bus is adapted to receive instructions from an external storage device. The data bus is adapted for bi-directional transfer of data between the processor and external storage device. The address bus is shared between the instruction and data accesses and is implemented in a pipeline fashion so that it can be released before an instruction or data transfer is completed. This allows a subsequent access to begin before the first is completed and allows the processor to have two accesses in progress simultaneously.

The register file is included with the processor and contains a plurality of general purpose registers allowing most instruction operands to be fetched without the delay of external access. The register file incorporates several features which aid the retention of data required by an executing program, including stack pointer addressing and register bank protection.

The branch target cache, according to the architecture of the present invention, supplies instructions for branches, if the given branch has been take previously, while a new prefetch stream for the branch sequence is established by instruction fetching apparatus. The branch target cache stores the first few instructions of a number of branch sequences that are taken by the processor. By maintaining the branch sequence in the branch target cache, branches execute in a single cycle. This has a positive effect on processor performance, because of the amount of time the processor could otherwise be idle waiting for the new instruction stream.

Accordingly, an apparatus according to the present invention, processes data in response to a program composed of prespecified instructions in pipeline cycles. The data is stored in locations in a data memory addressed by data addresses and instructions are stored in locations in an instruction memory addressed by instruction addresses. The apparatus comprises an instruction fetch unit, including an instruction interface adapted for connection to the instruction memory and for fetching instructions from the instruction memory. The instruction fetch unit includes an instruction prefetch buffer coupled to the instruction interface for buffering a sequence of instructions supplied to the instruction interface. A branch target cache is coupled with the prefetch buffer for storing sets of instructions retrieved from a corresponding set of locations in the instruction memory, having sequential instruction addresses. The first instruction in each such set is a branch target instruction in the program. In addition, the instruction fetch unit includes an instruction register, coupled to the prefetch buffer and the branch target cache, for staging under program control, one instruction per pipeline cycle from the buffer or the cache.

The apparatus includes in addition, an execution unit, coupled to the instruction register and including a data interface adapted for connection to the data memory, for executing the instructions staged from the instruction register pipeline cycles. The execution unit includes a storage facility, coupled to the data interface, for storing data in a file of data locations identified by file addresses. The storage facility includes at least two read ports and one write port operable in response to file addresses. An addressing unit coupled to receive the instructions from the instruction register, supplies the file addresses to the read ports and the write port under program control. In addition, the addressing unit is operable in response to a stack pointer providing dynamic allocation of the file of data locations to processes within the program.

Further, the execution unit includes an execution facility for executing the instructions and generating the resulting data, a result register for staging resulting data, and means for generating instruction addresses for branches.

Finally, the apparatus includes a memory management unit, coupled to the data interface and the means for generating instruction addresses. The memory management unit includes an address interface adapted for connection to the data memory and the instruction memory for supplying instruction addresses to the instruction memory and data addresses to the data memory, in a simple single access mode, a pipeline mode and a burst mode.

BRIEF DESCRIPTION OF THE DRAWINGS

FIG. 9 is a diagram illustrating organization of the register file.

DESCRIPTION OF THE PREFERRED EMBODIMENT

A detailed description of the preferred embodiment of the present invention is provided with reference to the figures. First, an overview of the data processing system and the architecture of the microprocessor in the data processing system is described with reference to FIGS. 1 and 2. Then, the apparatus for fetching instructions in the microprocessor of FIG. 2 is described with reference to FIGS. 3, 4, 5, and 6. Next, the execution unit of the microprocessor shown in FIG. 2 is described with emphasis on a register file as shown in FIGS. 7, 8, 9 and 10. Finally, FIGS. 11-15 show the control flow for instruction and data accesses between the processor and slave memory devices according to the three-bus structure of the microprocessor of FIG. 2.

Additional details concerning the preferred embodiment of the present invention are available in the publication entitled *AM29000 User's Manual*, Advanced Micro Devices, Inc., 901 Thompson Place, P.O. Box 3453, Sunnyvale, Calif. 94088. The *AM29000 User's Manual* is incorporated by reference in this specification.

I. System Overview—FIG. 1

Figure 1:
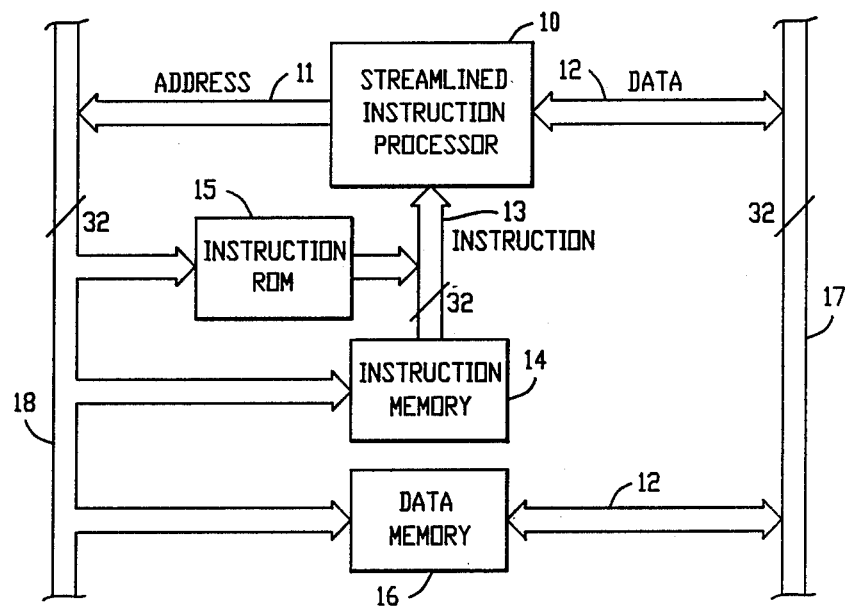
FIG. 1 is an overview block diagram for the processing system of the present invention.
Figure 2:
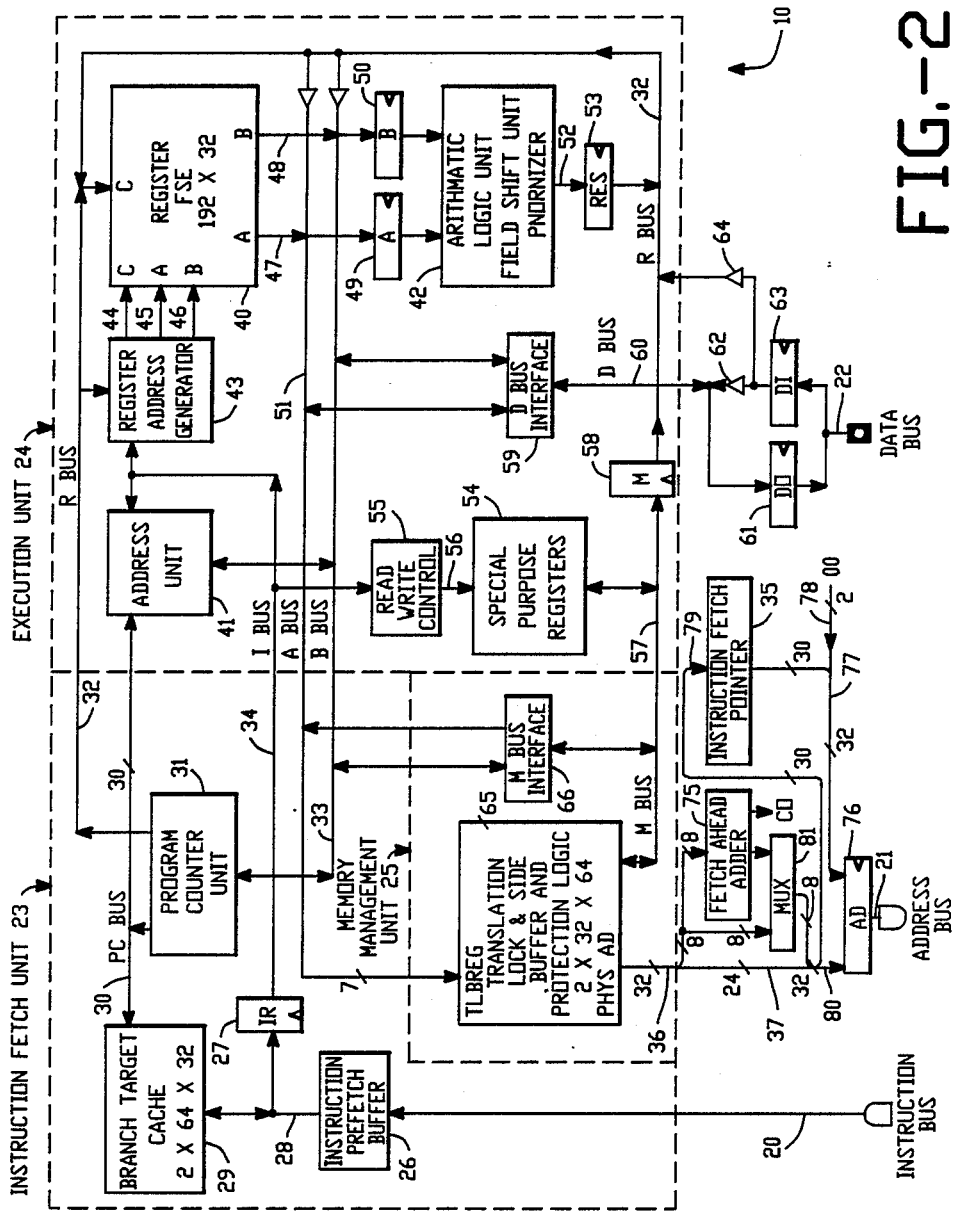
FIG. 2 ia a data and instruction flow block diagram for the data processing architecture according to the present invention.

The preferred embodiment of the present invention is a streamlined instruction processor 10 adapted for use in a data processing system as illustrated in FIG. 1. The processor 10 is adapted for connection to an address bus 11, a data bus 12 and an instruction bus 13. The address bus supplies addresses to an instruction memory 14 which returns instructions across the instruction bus 13. In addition, the instruction memory may include an instruction ROM 15 which is coupled to the address bus 11 and the instruction bus 13 as well. The address bus 11 is also coupled to supply addresses to a data memory 16 which is coupled to the data bus 12 for bi-directional transfer of data between the streamlined instruction processor 10 and the data memory.

As illustrated in FIG. 1, the data bus is connected to a system data bus 17 which may be connected to other devices within the data processing system for the transfer of data. Likewise, the address bus is connected to a system address bus 18 which can be extended to devices other than those illustrated in FIG. 1. FIG. 1 is meant to illustrate the basic data processing system for which the processor 10 according to the present invention, is adapted.

The instruction memory 14 may be a random access memory device which is adapted for supplying a stream of instructions having sequential addresses to the processor 10, or any memory device which can support the control protocols discussed below with reference to FIGS. 11-15. Likewise, the data memory may be a random access memory device.

II. Processor Architecture—FIG. 2

FIG. 2 is a block diagram illustrating the instruction and data flow architecture of the processor 10 according to the present invention. The processor 10 includes an instruction interface 20 adapted for connection to the instruction bus 13, an address interface 21 adapted for connection to the address bus, and a data interface 22 adapted for connection to the data bus. Not shown in FIG. 2 are control signals supplied to the processor 10 or the flow of control information through the architecture. Specification of those control signals can be found in the cross-referenced *Am 29000 User's Manual*. Reference to pertinent control signals that relate to the present invention will be made as appropriate throughout this specification. Implementation of control circuitry pertinent to the present invention is straightforward in view of the following detailed description.

The processor 10 includes three major functional units: the instruction fetch unit 23, the execution unit 24, and the memory management unit 25. Further, the processor supports a four-stage pipeline: (1) instruction fetching, (2) decoding, (3) executing, and (4) writing back.

The instruction fetch unit 23 performs the functions required to keep the processor pipeline supplied with instructions. Since the processor can execute one instruction per cycle, instructions must be supplied at this rate if the execution stage is to perform at the maximum rate. To accomplish this, the instruction fetch unit contains mechanisms for requesting instructions from instruction memory before they are required for execution, and for caching the most recently executed branch target instructions. The instruction fetch unit 23 also incorporates the logic necessary to calculate and sequence instruction addresses.

The instruction fetch unit 23 includes an instruction prefetch buffer 26 which is connected to the instruction interface 20. In addition, it includes an instruction register 27 which is connected across line 28 to the instruction prefetch buffer 26. The output of the instruction register 27 is staged across the instruction bus 34. A branch target cache 29 is connected across line 28 to the instruction register 27 and to a program counter bus 30. Instruction fetch unit 23 also includes a program counter unit 31 connected to the program counter bus and to an internal result bus 32. In addition, the program counter unit 31 is connected to an internal B-bus 33. Finally, the instruction fetch unit 23 includes an instruction fetch pointer register 35 and a fetch ahead adder system 37 connected to receive physical addresses across lines 36 from the memory management unit 25 and stage addresses to the address interface 21.

The execution unit 24 performs most of the operations required for instruction and execution. It incorporates the register file 40, the address unit 41, the arithmetic logic unit, field shift unit and prioritizer 42 and other components.

The address unit 41 is coupled to the program counter bus 30, the B-Bus 33, and the instruction bus 34. It computes addresses for branch target instructions, and load-multiple and store-multiple sequences. It also assembles instruction-immediate data and creates addresses for restarting terminated instruction prefetch streams.

Associated with register file 40 is a register address generator 43 coupled to the instruction bus 34. The register address generator 43 computes register numbers for operands, detects pipeline data dependencies, and calculates register number sequences for load multiple and store multiple operations. The register address generator 43 supplies a write register file number on line 44 to the register file 40, and two read register file numbers across lines 45 and 46 to the A and B read port of the register file. The results of the read access to the register as identified on lines 45 and 46 are supplied on lines 47 and 48 to an A register 49 and a B register 50, respectively. In addition, the signal on line 47 is connected to the A operand bus 51 and the signal on line 48 is connected to the B operand bus 33. The outputs of the A register 49 and the B register 50 are supplied as operands to the arithmetic logic unit, field shift unit and prioritizer 42. The result of execution of the instruction in response to the operands is supplied on line 52 to result register 53. The result register 53 is coupled to the result bus 32 for supply to the write port of the register file 40.

The execution unit 24 also includes a plurality of special purpose registers shown conceptually as a block, 54, which provide controls and data for prespecified processor operations. A specification of the special purpose registers and their contents is provided in the cross-referenced *Am29000 User's Manual*. It is not set out in detail here. Special purpose registers pertinent to the present invention are described where appropriate.

In the execution unit 24, a read and write control logic 55 is connected to the special purpose registers across line 56. The read and write control logic 55 is connected to the instruction bus 34 and controls special read and write conditions for the special purpose registers. The special purpose registers are also connected to the memory bus 57 which is connected to an M register 58 that is coupled to the result bus 32, providing a path for writing the contents of the special purpose registers to the register file 40.

The execution unit 24 also includes a data bus interface 59 which is coupled to the A and B buses for bi-directional transfer of data. The data bus interface 59 is coupled to the internal D bus 60 of the processor which is connected to a data out register 61 and through driver 62 to a data in register 63. The data in register 63 is also coupled through driver 64 to the result bus 32. The data out and data in registers 61, 63 are coupled to the data bus interface 22.

The memory management unit 25 of the processor 10 performs all memory management functions associated with the processor. Address translation is performed during the execute stage of any load, store or branch instruction which requires address translation. Address translation is also performed whenever the processor requires an instruction which has not been prefetched; as discussed below, address translation is performed in this case to resolve certain exceptional events which occur during instruction prefetching.

The memory management unit 25 includes translation lookaside buffer and protection logic 65 coupled to the A bus 51 to receive a 7-bit TLB register number for use in the translation. The output of the translation is supplied on a physical address bus 36. In addition, the translation lookaside buffer and protection logic 65 is coupled to the memory bus 57. A memory bus interface unit 66 is coupled to the memory bus 57 and to the A bus 51 and the B bus 33 providing a path by which data can be read and written into translation lookaside buffer locations or supplied as addresses on line 36.

The present invention works to optimize the flow of instructions and operands to the arithmetic logic unit, field shift unit and prioritizer 42 and to the memory management unit 25 in order to keep the pipeline of the processor as full as possible. The path used in optimizing this flow comprises the instruction prefetch buffer 26, fetch ahead adder system 37, branch target cache 29, program counter unit 31, address unit 41, register address generator 43 and register file 40. In addition, the protocols for operation of the instruction bus 20, address bus 21 and data bus 22 are optimized. Accordingly, the implementation of the pertinent sections of the processor 10 are described below with reference to FIGS. 3–15.

III. Instruction Prefetch Buffer

The processor is word-oriented, but generates 32-bit byte addresses for all external accesses. Since all processor instructions are word-length and are aligned on word address boundaries, the instruction fetch unit deals with 30-bit addresses. For external instruction accesses, these addresses are appended at the instruction fetch pointer 35 with 00 in the two least significant bit locations to form the required 32-bit address.

All instructions executed by the processor 10 are fetched either from the branch target cache 29 or from external instruction memory across the instruction interface 20. When instructions are fetched from an external memory, they are requested in advance to assist timing of instruction accesses. The processor attempts to initiate the fetch for any given instruction at least four cycles before it is required for execution.

Since instructions are requested in advance based on a predicted need, it is possible that a prefetched instruction is not required immediately for execution when the prefetch completes. To accommodate this possibility, the instruction prefetch buffer 26 provides a mechanism for buffering the sequence of instructions provided to the interface 20. The instruction prefetch buffer 26 is a four-word, circularly addressed buffer which acts as a first-in/first-out queue for instructions. When instruction fetching is enabled, the processor 10 requests an external instruction fetch on any cycle for which the instruction prefetch buffer 26 contains an available location. Instructions are stored in the instruction prefetch buffer 26 as they are returned across the interface 20. An instruction is stored into the instruction prefetch buffer location whose number is given by bits 3-2 of the instruction address. The instruction is held in the instruction prefetch buffer 26 until it is required for execution. When required, the instruction is sent to the instruction register 27 to the decode stage of the processor pipeline, and the instruction prefetch buffer is freed to receive a subsequent instruction.

Figure 3:
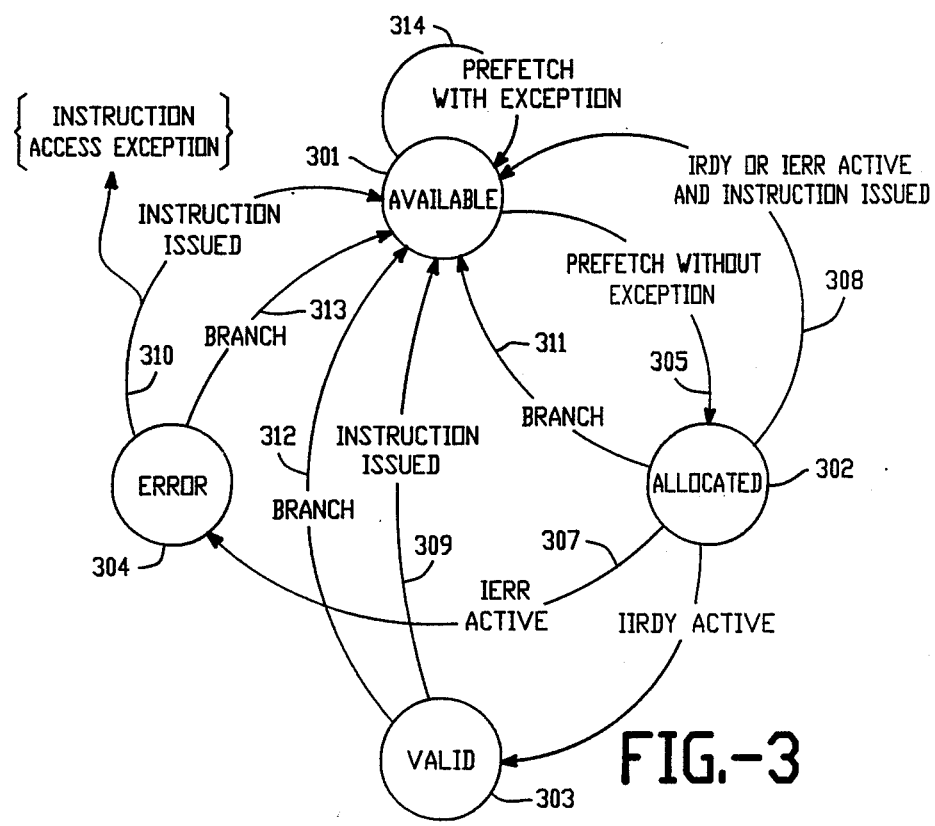
FIG. 3 is a state diagram illustrating the operation of the instruction prefetch buffer shown in FIG. 2.

Four states are associated with each instruction prefetch buffer location as illustrated in FIG. 3. The states include "available" 301, "allocated" 302, "valid" 303, and "error" 304. In the "available" state, the location is free to receive a new fetch. It contains no valid instruction and is not due to receive any requested instruction. In the "allocated" state, the location has been scheduled to receive a requested instruction which has not yet been returned from the external instruction memory. In the "valid" state, the location contains a valid instruction. In the "error" state, the location contains an instruction which was returned from external memory with an instruction error indication.

For a location in the "available" state 301, if all internal conditions are such that an instruction fetch can occur, the location given by bits 3-2 of the instruction address, is set to the allocated state (line 305), and the instruction is requested externally. Once this instruction is returned to the processor across the interface 20, it is stored in the allocated location. The location is then set to the "valid" state (line 306), if the control signal instruction ready IRDY is active. If the control signal instruction error IERR is active, the location is set to the error state 304 (line 307). However, if the instruction is needed for immediate use and the instruction ready or instruction error signals are active, the instruction is staged to the instruction register 27 and the state transitions across line 308 to the available state 301.

A location in the valid or error state stores the instruction until it is required for execution. When the instruction is required, it is issued to the decode stage, and the instruction prefetch buffer location is set to the available state (lines 309, 310). If the location is in the error state 304, it still transitions to the available state, but an instruction access exception trap occurs (line 310).

When a non-sequential instruction fetch occurs, all buffer locations are set to the available state during the execute stage of the non-sequential fetch (lines 311, 312, 313). All requests for instructions in the previous prefetch stream are terminated at this time. At most, one instruction from the previous stream will be returned to the processor after instruction fetches are terminated; this instruction is returned before any instruction associated with the new instruction stream is requested externally.

The error state 304 is provided only to handle errors reported via the instruction error input IERR. However, there are many other situations in which the instruction prefetch buffer does not contain a valid instruction. These situations arise because of exceptional conditions, such as memory management and protection violations, and because instruction fetching is sometimes preempted, such as when the instruction fetch pointer adder overflows (as discussed below). All of these cases are indicated by the fact that the instruction prefetch buffer location will remain in the available state when the instruction subject of the exception is required for execution (line 314).

If the processor requires an instruction from an instruction prefetch buffer location which is in the available state due to an exceptional condition, it initiates the fetch for the instruction using the current value of the program counter. This fetch resolves the exceptional condition. It either performs an address translation with the proper address, eliminating page boundary crossing problems, or re-creates an error condition in which case a trap occurs.

It is possible for all instruction prefetch buffer locations to be in the available or valid states, but only one is allowed to be in the allocated state at any given time. This restricts the number of unsatisfied instruction prefetches to one, reducing the amount of logic required to keep track of external fetches. It additionally restricts the number of apparent pipeline stages in the external prefetch mechanism to one stage (the other stages involved in the four-stage fetch/prefetch pipeline are the request stage and the processor's fetch and decode stages). Larger external prefetch pipelines can be implemented but they are required to appear as single stage of the fetch/prefetch pipeline; at most one instruction can be returned to the processor from the old instruction prefetch stream after a non-sequential fetch occurs.

IV. Branch Target Cache—FIGS. 4 and 5

The branch target cache 29 on the processor 10 allows fast access to instructions fetched non-sequentially. A branch instruction may execute in a single cycle, if the branch target is in the branch target cache. The branch target cache 29 is managed so that the target of a non-sequential fetch will be in the branch target cache if a similar fetch to the same target has occurred recently enough that it has neither been replaced by the target of another non-sequential fetch, nor invalidated by special instructions which operate to re-set the valid bits in the branch target cache.

Figure 4:
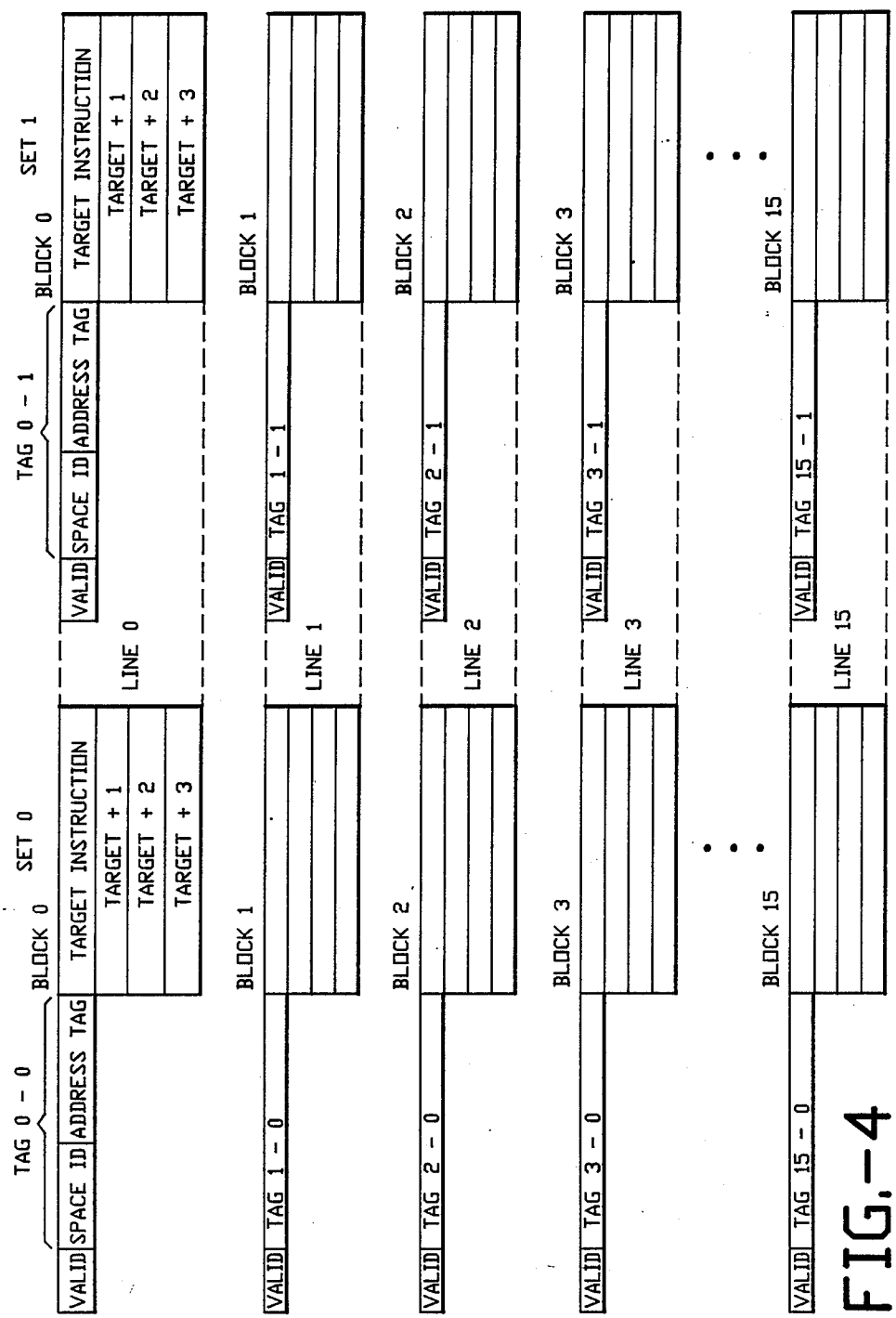
FIG. 4 is a diagram illustrating the organization of the branch target cache according to the present invention.

The organization of the branch target cache 29 is illustrated in FIG. 4. To improve the ratio of the number of branch targets found in the cache 29 compared with the number of attempted cache accesses, two-way, associative mapping is used. Accordingly, as shown in FIG. 4, the cache includes set 0 and set 1.

The branch target cache 29 is a 512-byte storage array in the preferred embodiment, divided into two sets, each consisting of 64 32-bit words, where each instruction occupies one word. Sets are further divided into 16 blocks, numbered block 0 through block 15 for each set. Each block consists of four words each. Blocks in different sets with equivalent block numbers are organized into a unit called a line.

To eliminate fragmentation within the branch target cache, each branch target entry is defined as a sequence of exactly four instructions, and is aligned on a cache block boundary. A branch target sequence occupies at most one block in order to best utilize the on-chip storage.

A 28-bit cache tag (tag 0-0, tag 1-0, tag 2-0, tag 3-0, . . . tag 15-0 and tag 0-1, tag 1-1, tag 2-1, tag 3-1, . . . tag 15-1), is associated with each four word block. Of the 28 bits, 26 bits are an address tag derived from the address of the instructions of the block.

Two additional bits in each cache tag called the space identification field (space ID), indicate the instruction memory from which the instructions are fetched and the program mode under which the instructions are fetched. The encoding of these bits is described below.

| Space ID | Mode/Instruction Address Space |
| --- | --- |
| 00 | User mode/instruction-data memory |
| 01 | User mode/instruction read only memory |
| 10 | Supervisor mode/instruction-data memory |
| 11 | Supervisor mode/instruction read only memory |

In addition, a valid bit is associated with each cache word, indicating that the associated word contains a valid instruction in the branch target sequence. Thus, there are four valid bits in each cache block which are stored with the tag.

Figure 5:
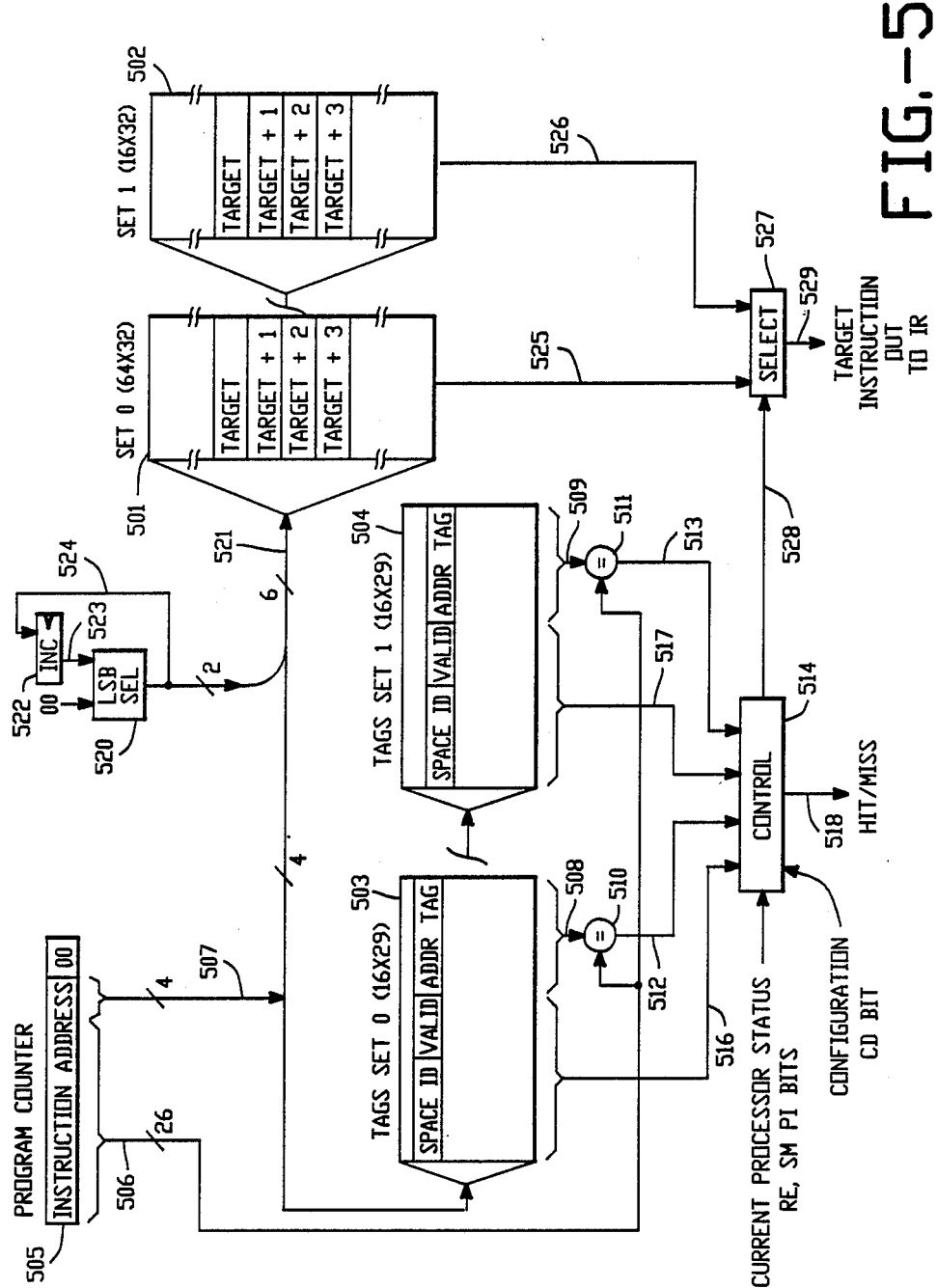
FIG. 5 is a diagram illustrating operation of the branch target cache according to the present invention.

FIG. 5 illustrates the operation of the branch target cache. The branch target cache as illustrated includes a register array 501 for the instruction set 0 and a register array 502 for the instruction set 1. In addition, a register array 503 for the tags associated with set 0 and a register array 504 for the tags associated with set 1 are provided. A program counter register 505 which contains the address of the currently needed instruction for the processor, supplies the 30 most significant bits of its address as inputs to the branch target cache. The 26 most significant bits are supplied on line 506 for comparison with the address tags as discussed below. The 4 remaining bits of the 30-bit address are supplied on line 507 as an address to a target instruction line in the branch target cache. Four bits are directly supplied as an address to the register arrays 503 and 504 in order to access the tags associated with target sequences toward the branch target cache. The address tag is supplied from the tag arrays 503, 504 on lines 508 and 509, respectively. Lines 508 and 509 connected to comparators 510 and 511 which are coupled to line 506. If the 26 most significant bits of the current instruction address on line 506 match the address tag in one of the tag arrays, a hit signal will be supplied on lines 512 or 513 to control 514. In addition, the space ID and valid bits for the accessed register in the tag arrays are supplied on lines 516 and 517 to the control 514. The control 514 generates a branch target cache hit/miss signal on line 518.

The control 514 is also coupled to the special purpose registers 54 shown in FIG. 2. One of the special purpose registers is designated the current processor status register. The register includes a ROM enable bit RE which is used to enable instruction fetching from an external instruction read only memory. When this bit is 1, all instruction requests are directed to the ROM when an instruction request type signal indicates a ROM access during an instruction request. The current processor status register also includes a supervisor mode bit SM which indicates that the processor is operating in the supervisor mode. When the SM bit is 1, the processor is in the supervisor mode and access to all state information is allowed. When the bit is 0, the processor is in the user mode and accesses to certain protected states are not allowed. Further, the current processor status register includes a physical addressing/instructions bit PI which determines whether address translation is performed for external instruction accesses. In addition, the special purpose registers include a configuration register. This register includes a branch target cache disable bit CD which determines whether or not the branch target cache is used for non-sequential instruction references. When this bit is 1, all instruction references are directed to external instruction memory or instruction ROM, and the branch target cache is not used. Regardless of the state of the CD bit, the targets of non-sequential instruction fetches are stored in the branch target cache for use. Therefore, branches taken while use of the cache is disabled, are reflected in the cache and are available for use in case the status CD bit changes. The value of the CD bit does not take effect until the execution of a next branch target instruction after CD bit changes.

Address translation is performed only when this bit is 0. The hit/miss signal indicates a branch target cache hit in a given cache block only if the following conditions are met:

(1) Bits 31-6 of the address on line 506 match the corresponding bits in the address tag associated with the block.

(2) The address of the first instruction in the block has a valid translation in the memory management unit if it is a virtual address as indicated by the PI bit.

(3) The instruction address space as indicated by the current processor status register control bits matches the space ID.

(4) The CD bit of the configuration register is 0 for the previous non-sequential instruction fetch.

In addition to the requirements above, the valid bit must be 1 for any entry retrieved from the cache. Note that it is not required that all instructions in the sequence be present in the cache in order for the block to be considered valid.

In parallel with the generation of the hit/miss signal on line 518, bits 5-2 of the address in the program counter register 505 are supplied on line 507 for accessing the register arrays 501, 502 storing the target instructions. The 2 least significant bits of the address which accesses the registers arrays 501, 502 are generated at the output of the line selector 520. For a first instruction, the line selector 520 selects two zeroes as the two least significant bits for the address accessing the register arrays 501, 502 across line 521. For each subsequent access up to a maximum of four, the least significant bit selector 520 selects the output of incrementor 522 across line 523. The input to the incrementor 522 is supplied on line 524 from the output of the selector 520. In this way, the output of the selector 520 is a sequence of 00, 01, 10, 11 in order to generate accesses to each of the four lines of instructions in a target sequence.

The target instruction accessed by the address on line 521 from set 0 and set 1 are supplied on lines 525 and 526, respectively, to a selector 527. The selector is controlled by a signal on line 528 generated by the control 514 in response to the signals on lines 512 and 513 indicating which set includes the matching target instruction. The output of the selector 527 is supplied on line 529 to the instruction register 27 as shown in FIG. 2 for use in the decode stage of the processor pipeline.

Whenever a non-sequential fetch occurs for branch instruction, an interrupt or a trap, the address for the fetch is presented to the branch target cache at the same time that the address is translated by the memory management unit. If the target instruction for the non-sequential fetch is in the cache, it is presented for decoding in the next cycle. This instruction is always the first instruction of the cache block, and its address matches the cache tag. Subsequent instructions in the cache are presented for decoding as required in subsequent cycles. However, their addresses do not necessarily match the address tag.

If on a non-sequential fetch, the target instruction is not found in the branch target cache, the address of the fetch selects a line to be used to store the instruction sequence of the new branch target. The block of instructions replaced within the branch target cache is selected from set 0 or set 1 at random, based on the processor clock. Random replacement has slightly better performance than does least recently used replacement and has simpler implementation.

All valid bits associated with the selected entry are reset, the address tag is set with the appropriate address bits of the first instruction in the sequence, and the space ID bits are set according to the current processor status register. Instructions from the new fetch stream are stored in the selected cache block as they are issued to the decode stage. The first instruction is stored into the first word of the block, the second instruction into the second word of the block, and so on to a maximum of four instructions. The valid bits for each word are set as the instruction is stored.

The paths for writing data into the tag set arrays 503, 504 and the instruction set arrays 501, 502 are not shown in the figure in order to clarify its presentation.

A block of instructions in the branch target cache may include a branch instruction. If a branch instruction appears as one of the first two instructions in a branch target sequence stored in the branch target cache, the branch is executed before the branch target cache is filled. In this case, the cache block will contain less than four valid instructions. The final valid instruction will be the delay instruction with the branch, for systems using the instruction set as described in the *Am29000 User's Manual.*

When a block in the branch target cache is only partially filled due to a branch within the block, the behavior of the cache during subsequent executions of the instructions in the block depends on the outcome of this branch. If the branch is subsequently successful, then the instructions following the delay instruction of the branch are not needed, and the fact that they are not retained in the cache is irrelevant. If the branch is subsequently unsuccessful, then the instructions following the delay instruction are required and must be fetched externally. In this case, a required entry has a valid bit 0. When the invalid entry is encountered, the program counter is used to create an external instruction fetch for the missing instruction. When the fetch completes, the instruction is stored in the cache location which was previously invalid and the valid bit for the entry is set.

Since an instruction sequence in the four word branch target cache is not necessarily aligned on a four-word address boundary, a virtual page address boundary may be crossed for the sequence in the cache. The processor does not prefetch instructions beyond this boundary, so the cache block is only partially filled in this case. If the processor requires instructions beyond the boundary, it creates a fetch for them as described above for the case of a branch instruction in the cache block.

When a fetch is created for a page boundary crossing, this fetch is treated as a non-sequential fetch; a new cache block is allocated, and the first four instructions at the boundary are placed into the new cache block as they are returned by the instruction memory. Subsequent references to the original cache block will also encounter an invalid instruction at the page boundary and also create a special fetch for this instruction. However, since the instructions beyond this boundary are in the branch target cache, subsequent boundary crossings do not incur the instruction fetch latency.

The branch target cache is accessed with virtual as well as physical addresses, depending on whether address translation is enabled for instruction accesses. Because of this, the branch target cache may contain entries which might be considered valid when they are not. For example, address translation may be changed by a change in the process identifier of the memory management units configuration register. This change is not reflected in the branch target cache tags, so they do not necessarily perform valid comparisons. Also, the branch target cache does not differentiate between virtual and physical addresses, so it may perform an invalid comparison after address translation for instructions is enabled or disabled. If a TLB miss occurs during the address translation for a branch target instruction, the processor considers the contents of the branch target cache to be invalid. This is required to properly sequence the least recently used algorithm of the memory management unit and does not solve the problem just described. If the TLB has changed at some point, so that the TLB miss does not occur, the branch target cache may still perform an invalid comparison. To avoid the above problem, the contents of the branch target cache must be explicitly invalidated. This is accomplished in the preferred embodiment by providing special instructions that invalidate branch target cache entries. Two such instructions are provided in the preferred embodiment as described in the *Am29000 User's Manual*.

V. Fetch Ahead Adder System

The fetch ahead adder system 37 will be described with reference to FIG. 2. When a non-sequential instruction fetch occurs, the memory management unit performs an address translation for the target instruction if address translation is enabled. If the address translation is valid, and the target of the fetch is not in the branch target cache, an external instruction fetch is initiated. If there is a translation lookaside buffer miss or memory protection violation of this address, fetching is not initiated.

When a non-sequential fetch occurs, if the target of the fetch is found in the branch target cache 29, the processor normally begins instruction fetching for instructions beyond the target. This behavior is termed "fetch ahead" and carried out with the fetch ahead adder system 37. The computation required to obtain the address for the fetch ahead is performed in parallel with address translation by 6-bit adder 75, termed the fetch ahead adder. The fetch ahead adder 75 is restricted to 6 bits so that the add cannot cause page boundary crossing. The minimum virtual page size is one kilobyte in the preferred embodiment and all instructions are 32 bits in length, so the restriction of the fetch ahead adder may vary for systems using different size pages and instruction lengths. If the adder were larger, then the results of the add might affect the outcome of the address translation, and the add could not be performed in parallel with the address translation.

When the target of a non-sequential fetch is in the branch target cache, there are two cases for which a fetch ahead is not initiated. The first case occurs when the fetch ahead adder overflows during the address computation for the fetch ahead as indicated by a carry out CO of the fetch ahead adder. In this case, a page boundary may have been crossed, making invalid the address translation which is performed in parallel with the add step. The second case occurs when the branch target cache block containing the target instruction, does not have valid bits set for all entries within the block. In this case, the processor may have to fetch instructions for these entries, so it does not immediately initiate prefetching beyond the block. If fetch ahead is not initiated for an instruction which the processor eventually requires, this fetch is re-started on the cycle in which the missing instruction is required. The program counter is used for both these cases, guaranteeing that the proper instruction address is used.

Instruction addresses are supplied to address register 76 across line 77 from the instruction fetch pointer 35. The instruction fetch pointer is a 30-bit field which is concatenated with two zeroes across line 78 for supply to line 77. The input to the instruction fetch pointer 35 is supplied on line 79 which is coupled to supply the 30 most significant bits of the 32 bits on line 80. The 32 bits on line 80 are supplied at the output of multiplexer 81. The inputs to multiplexer 81 include the output of the fetch ahead adder 75 and the 8 least significant bits of the physical address supplied on line 36. The multiplexer is controlled to cause the fetch ahead process under the conditions discussed above. Otherwise, the physical address is supplied directly through multiplexer 81 to line 80 and to the instruction fetch pointer 35. Operand addresses are supplied directly through on line 80 to the address register 76.

VI. Program Counter Unit

Figure 6:
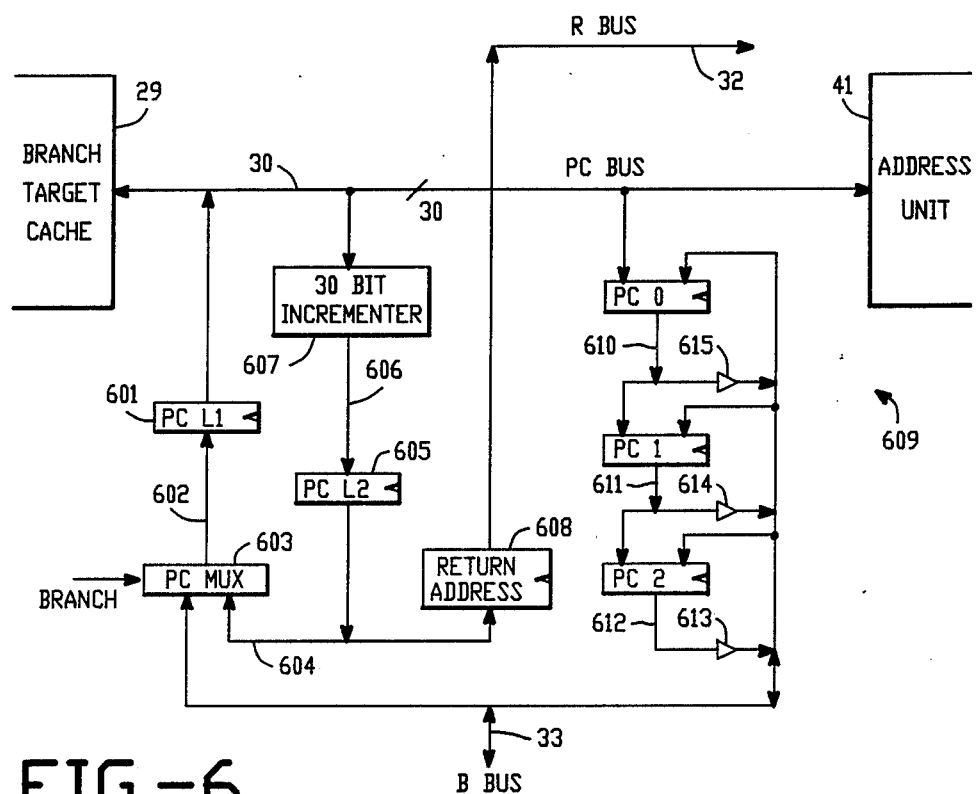
FIG. 6 is a block diagram of the program counter unit shown in FIG. 2.
Figure 7:
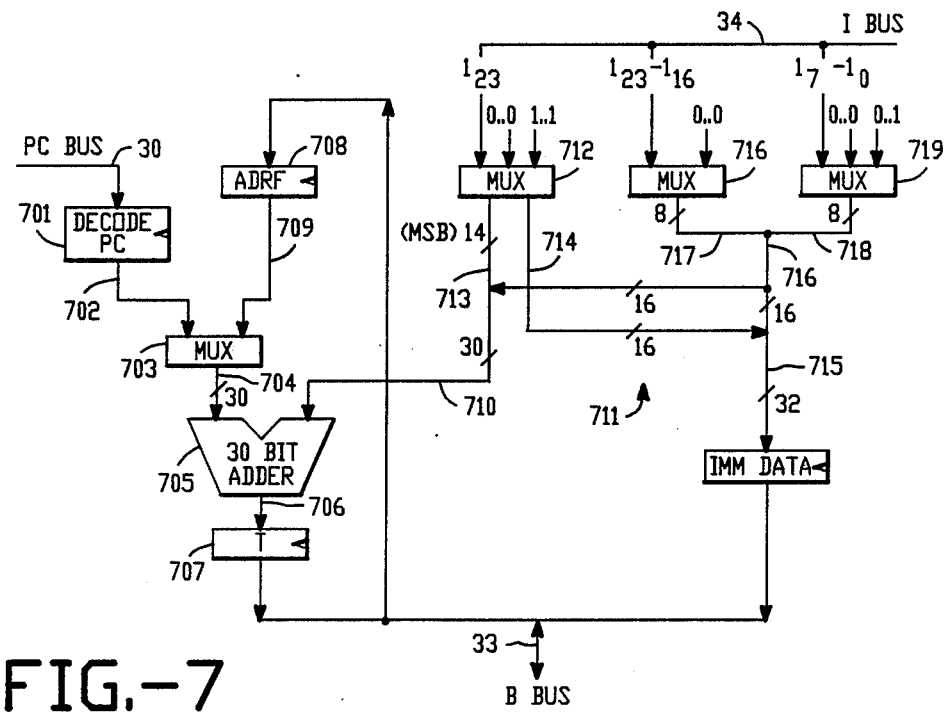
FIG. 7 is a block diagram of the address unit shown in FIG. 2.

The program counter unit is illustrated in FIG. 6. It includes a program counter bus 30 which is coupled to the branch target cache 29 and address unit 41. The value on the program counter bus 30 is supplied at the output of the program counter level one register 601. This register contains the address of the instruction being fetched by the instruction fetch unit. Its value is supplied on line 602 at the output of the program counter multiplexer 603. Inputs to the program counter multiplexer 603 include the B bus 33 and the signal on line 604. The signal on line 604 is supplied at the output of the program counter register level two 605 which contains the next sequential address for supply to the program counter level one register 601. The input to the program counter level two register 605 is supplied on line 606 at the output of a 30-bit incrementor 607. The input to the incrementor 607 is the program counter bus 30. The address on line 604 is also supplied to a return address latch 608 which is coupled to the R bus 32. In addition, the program counter unit includes the program counter buffer 609 which comprises the PC0 register, PC1 register and PC2 register. These special purpose registers are used to store the instructions being executed in the processor pipeline. Accordingly, PC0 is connected to the PC bus 30; its output is connected on line 610 at the input of PC1. The output of PC1 is supplied on line 611 to the input of PC2 and the output of PC2 is supplied on line 612 through a driver 613 to the B bus 33. In addition, the output of PC1 is supplied on line 611 through driver 614 to the B bus and the output of PC0 is supplied from line 610 through driver 615 to the B bus 33. Further, the B bus is coupled to the input of each of the registers PC0, PC1 and PC2.

The program counter unit performs and sequences instruction addresses for the instruction fetch unit. The PCL1 register 601 contains the address of the instruction being fetched in the instruction fetch unit. The slave of the PC register, PCL2 605, contains the next sequential address, which may be fetched by the instruction fetch unit in the next cycle.

The return address latch 608 passes the address of the instruction following the delayed instruction of a call to the register file. This address is the return address of the call. This is provided for special instruction implemented in the preferred embodiment designated CALL, which places the address of the second following instruction of the call instruction into the location designated in the call instruction. Then a non-sequential instruction fetch occurs, to an instruction address given by an operand designated in the call instruction. A delay instruction immediately following the call instruction is executed before the non-sequential fetch occurs.

The program counter buffer 609 stores the addresses of instructions in various stages of execution when an interrupt or trap is taken. Registers in this buffer, PC0, PC1 and PC2, are normally updated from the program counter as instructions flow through the processor pipeline. When an interrupt or trap is taken, the freeze bit FZ, in the current processor status special purpose register, is set, holding the quantities of the PC buffer 609. When the FZ bit is set, the PC0, PC1 and PC2 registers contain the addresses of instructions in the decode, execute and write back stages of the pipeline, respectively.

Upon execution of an interrupt return, the target instruction stream is restarted using the instruction addresses in PC0 and PC1. Two registers are required here because the preferred embodiment of the processor implements delayed branches as described in the *Am29000 User' Manual*. An interrupt or trap may be taken when the processor is executing the delay instruction of a branch and decoding the target of the branch. This instruction sequence must be properly restarted upon an interrupt return. Restarting the instruction pipeline using two separate registers, correctly handles this special case; in this case PC1 points to the delay instruction of the branch and PC0 points to its target. PC2 does not participate in the interrupt return, but it is included to report the addresses of instructions causing certain exceptions.

The program counter registers PCL1 and PCL2 are not special purpose registers and cannot be modified or inspected by instructions. Instead, the interrupting and restarting of the pipeline is done by the PC buffer registers PC0 and PC1.

VII. Address Unit—FIG. 7

Addresses for branch target instructions are computed by the address unit within the execution unit of the processor. In addition, the address unit generates addresses for load-multiple and store-multiple sequences. It also assembles instruction immediate data and creates addresses for re-starting terminated instruction prefetch streams.

The address unit receives a copy of the instruction address presented to the decode stage of the processor across the program counter bus 30 and latches it in a decode program counter register 701. This address is supplied on line 702 as an input to multiplexer 703. The output of multiplexer 703 is a 30-bit instruction address on line 704 which is supplied as one input to a 30-bit adder 705. The output of the adder is a target instruction on line 706 which is latched in the target latch 707. The output of the target latch is presented to the B bus 33 by which it may be transmitted to the program counter unit 31. The B bus is also coupled to an address latch 708 designated the ADRF latch. The output of the ADRF latch 708 is supplied on line 709 as a second input to the multiplexer 703 through which it may be presented as an input to the 30-bit adder 705. The second input to the 30-bit adder is supplied on line 710 from formatting logic 711. This logic 711 formats instruction immediate data and generates constants 0 and 1.

The formatting logic 711 is connected to the instruction bus 34. Bit 23 of the 32-bit bus is supplied as one input to multiplexer 712. Other inputs to multiplexer 712 include 16 zeroes or 16 ones. The 14 most significant bits at the output of the multiplexer 712 are supplied on line 713 as the most significant bits of the 30-bit address value supplied on line 710. All 16 bits supplied at the output of multiplexer 712 are supplied on line 714 as the 16 most significant bits of the 32 bits supplied on line 715.

Bits 23-16 of the instruction are supplied as one input to multiplexer 716. The second input to multiplexer 716 is all zeroes. The output of the multiplexer 716 is an 8-bit value on line 717 which is concatenated with an 8-bit value on line 718 to supply 16 bits on line 719. The 16 bits on line 719 are concatenated with the 16 bits on line 714 to form the 32-bit value on line 715 and with the 14 bits on line 713 to form the 30-bit value on line 710.

The signal on line 718 is supplied at the output of multiplexer 719. The inputs to multiplexer 719 include the bits 7-0 of the instruction, 8 zeroes, or 00000001.

Branch target addresses are either fetched from the register file across the B bus to the program counter unit 31 or calculated by the address unit. The address unit calculates target addresses during the decode stage of branch instructions. Two possible addresses types are generated by the address unit:

(1) PC-relative: the current program counter value is added to a sign extended, 16-bit offset field from the branch instruction.

(2) Absolute: a zero extended 16-bit field of the branch instruction is used directly as an instruction address.

For each of the two types of addresses calculated by the address unit, the 16-bit instruction field is aligned on a word address boundary; that is, it is shifted left by two bits.

To calculate the branch target address, the formatting logic 711 in the address unit formats the 16-bit instruction field as required and presents it to the 30-bit adder. This adder adds the formatted field either to the contents of the decode PC register 701 or to zero, as required for the PC-relative or absolute addresses, respectively.

During the execution of load multiple and store multiple instructions which are specified in the *Am29000 User's Manual*, addresses for the access sequence are held in the ADRF latch 708. An address in the ADRF latch 708 is updated, as required for an access in the sequence, by the 30-bit adder 705 in the address unit. The formatting logic creates a constant offset of one for the update. The updated address is presented to memory management unit across the B bus for translation and protection checking, and is placed back into the ADRF latch 708 for further address computations.

For load-multiple and store-multiple operations as specified in the *Am29000 User's Manual*, performed using burst mode accesses, the physical address for each access does not appear on the address bus 21, but the addresses are maintained in the address unit so that they can be used to re-start the burst mode access upon preemption.

As discussed above with reference to the branch target cache, the processor must create special instruction fetches when it encounters an invalid instruction in the middle of a branch target cache block, or when it attempts to fetch an instruction from an instruction prefetch buffer location which is in the available state. The address unit routes the address for this fetch in a manner similar to the routing of a branch target address. It passes the contents of the decode PC register 701 containing the required instruction address through the 30-bit adder 705, adding it to 0. This address is presented to the memory management unit for translation and is used in the instruction fetch unit to complete the fetch.

VIII. Register File

The processor includes a register file 40. The register file 40 is a triple port, 192-location file used for general purpose registers. The register file performs two read accesses and one write access in a single cycle. If a location is written and read in the same cycle, the data read is the same as the data written during the cycle.

Figure 8:
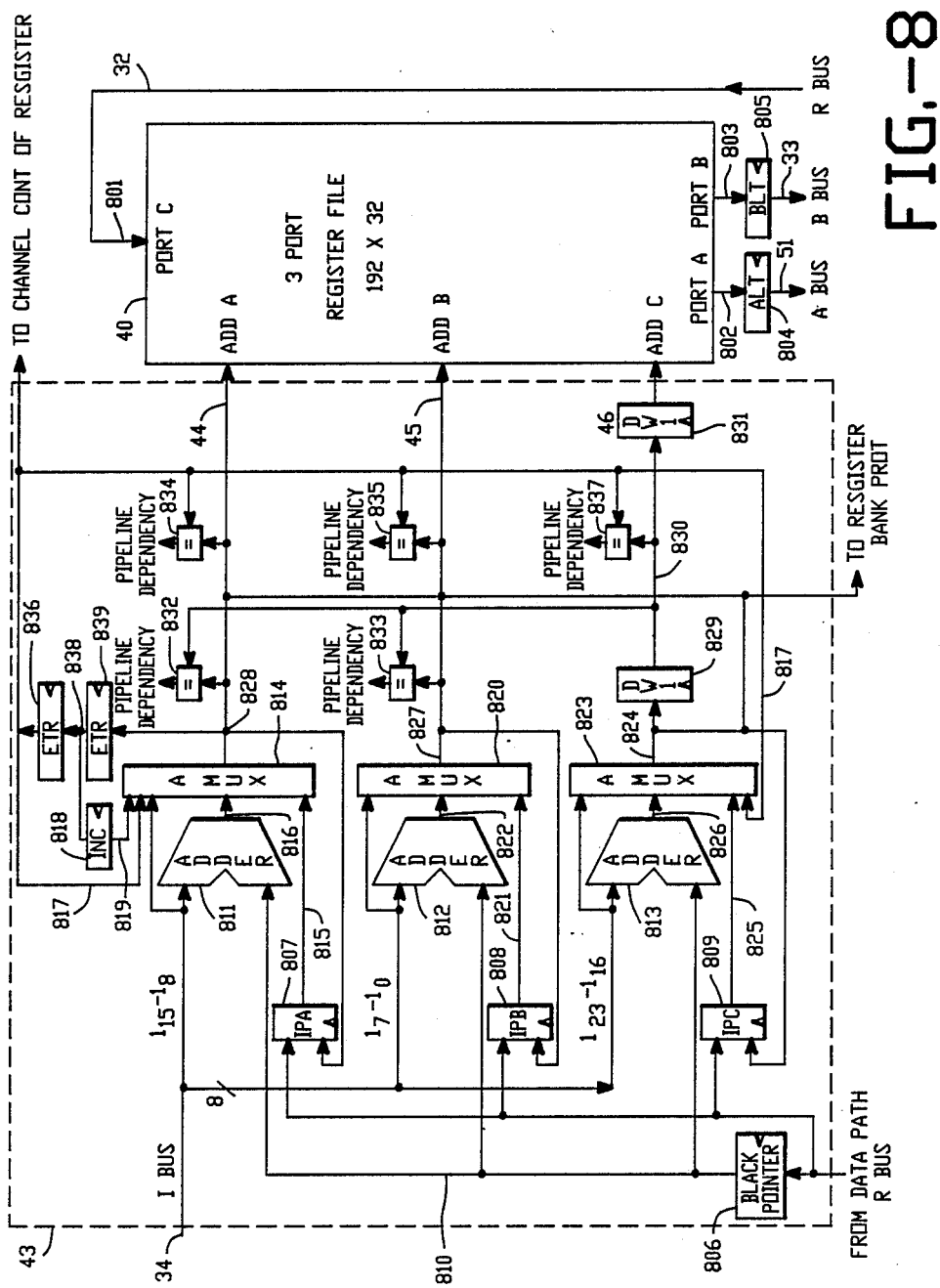
FIG. 8 is a block diagram of the register address generator and register file shown in FIG. 2.

FIG. 8 illustrates the register address generator 43 and the register file 40. The register file includes a write port 801, and two read ports, Port A, 802 and Port B, 803. The register address generator supplies an address for read port A on line 44, an address for read port B on line 45 and an address for the write port C, 801, on line 46. The input to the write port C, 801, is supplied across the result bus 32. The output of port A is supplied through the A output latch 804 to the A bus and the output of the B port 803 is supplied through the B output latch 805 to the B bus.

The organization of the register file 40 is illustrated in FIG. 9. General purpose registers in the register file hold the following types of operands for program use:
  (1) 32-bit data addresses;
  (2) 32-bit signed or unsigned integers;
  (3) 32-bit branch target addresses;
  (4) 32-bit logical bit strings;
  (5) 8-bit characters;
  (6) 16-bit signed or unsigned integers;
  (7) word length Booleans;
  (8) single precision floating point numbers;
  (9) double precision floating point numbers in two register locations.

Because a large number of general purpose registers is provided, a large amount of frequently used data can be kept on chip, where access time is fastest.

As illustrated in FIG. 9, register numbers 0 and 1 store special information, register numbers 64–127 are global registers, and register numbers 128–255 are local registers. Register numbers 2–63 are not implemented.

Register number 0 is used to specify that an indirect pointer is to be used as a source of a register number. The indirect pointers can be used for both read port instruction operand register numbers and write port result register numbers.

Global register 1 contains the stack pointer, which is used in the addressing of local registers as explained below.

Global registers 64–127 are accessed with the 7 least significant bits of the register number from the subject instruction. Local registers 128–255, indicated when the most significant bit of the register number is 1, are addressed by adding bits 8-2 of the stack pointer to the 8-bit register number and truncating the result to 7 bits. The most significant bit of the original register number is left at 1.

The stack pointer is a 32-bit register that may be an operand of an instruction as any other general purpose register. However, a shadow copy of global register 1 is maintained by processor hardware to be used in local register addressing. This shadow copy is set with the results of arithmetic and logic instructions. If the stack pointer is set with the result of any other instruction class, local registers cannot be accessed predictably until the stack pointer is once again set with an arithmetic or logical instruction. A modification of the stack pointer has a delayed effect on the addressing of the local registers. An instruction which writes to the stack pointer or indirect pointer can be immediately followed by an instruction which reads the stack pointer or indirect pointer. However, any instruction which references a local register also uses the value of the stack pointer or indirect pointer to calculate an absolute register number. Because of the pipeline implementation, at least one cycle of delay must separate an instruction which updates the stack pointer or indirect pointer and an instruction which references a local register. In most systems, this affects procedure call and return type instructions only. In general, though, an instruction which immediately follows a change to the stack pointer or indirect pointer should not reference a local register. Note that this restriction does not apply to a reference of a local register via an indirect pointer that has not been subject of an update.

Indirect pointers have an implementation similar to the stack pointer, and exhibit similar behavior. At least one cycle of delay must separate an instruction which modifies an indirect pointer and an instruction which uses that indirect pointer to access the register.

It is normally not possible to guarantee that the delayed effect of a stack pointer and indirect pointer is visible to a program. If an interrupt or trap is taken immediately after one of these registers is set, the interrupted routine sees the effect in the following instruction, because many cycles elapse between the two instructions.

The indirect pointers are implemented as three special purpose registers (block 54 of FIG. 2), indirect pointer C, indirect pointer A and indirect pointer B. Indirect pointer C is an unprotected special purpose register which provides a register number for use as the C port for writes to the register file when an instruction specifies the indirect pointer by call to global register 0 in its RC field. Likewise, indirect pointer A is an unprotected special purpose register which provides a register number for the A port for reads from the register file when an instruction RA field has the value of 0 specifying global register 0. Indirect pointer B is an unprotected special purpose register which provides a register number for the B port reads to the register file when the instruction has an RB field specifying global register 0.

The register address generator 43 is illustrated in more detail in FIG. 8. It includes a stack pointer register 806 coupled to receive bits 8-2 of global register 1 whenever global register 1 is written across the R bus with the result of an arithmetic or logic instruction. In addition, the register address generator 43 includes indirect pointer register A, 807, indirect pointer register B, 808, and indirect pointer register C, 809.

The stack pointer 806 is connected across line 810 as one input to an adder 811 for the A address, an input to adder 812 for the B address and an input to adder 813 for the C address. A second input to adder 811 for the A address is bits 15-8 of the instruction received across instruction bus 34. The second input to adder 812 for the B address is bits 7-0 from the instruction bus 34. The second input to adder 813 for the C address is bits 23-16 from the instruction bus 34.

The A address is supplied at the output of A multiplexer 814 on line 828. The inputs to the A multiplexer 814 include the output of the indirect pointer register 807 across line 815, the output of adder 811 across line 816, bits 15-8 of the instruction from the instruction bus 34, the target register TR field from the channel control register across line 817 and the output of the increment register 818 across line 819.

The B address is supplied at the output of B multiplexer 820 on line 827. The inputs to B multiplexer 820 include the output of the indirect pointer B register 808 across line 821, the output of adder 812 across line 822, and bits 7-0 from the instruction bus 34.

The C address is supplied at the output of C multiplexer 823 on line 824. The inputs to C multiplexer 823 include the output of the indirect pointer C register on line 825, the output of adder 813 on line 826 and bits 23-16 from the instruction bus 34.

The output on line 828 from the A multiplexer 814 is fed back as a second input to the indirect pointer A register 807. The output on line 827 of the B multiplexer 820 is fed back as a second input to the indirect pointer B register 808. Likewise, the output of the C multiplexer 823 is supplied on line 824 as a second input to the indirect pointer C register 809. These paths are used, for instance, in the SET INDIRECT POINTERS instruction to load the indirect pointer registers 807,808,809, with values from the instruction paths. The indirect pointer registers 807,808,809 can also be loaded across the data path (logically the R-Bus) to serve, for example, the MOVE TO SPECIAL REGISTER instruction.

The channel control register is a protected special purpose register used to report exceptions during external accesses. It is also used to re-start interrupted load-multiple and store-multiple operations and to re-start other external accesses when possible, for instance, when translation lookaside buffer misses are serviced. The channel control register is updated on the execution of every load or store instruction, and on every load or store in a load multiple or store multiple sequence, except under special control conditions indicated by the current processor status register. This channel control register includes control fields indicating the nature of the load or store operation and a target register TR field indicating the absolute register number of a data operand for the current transaction, either a load target or store data source. The register number in this field is absolute and reflects the stack pointer addition when the indicated register is a local register. It also includes a not needed NN bit indicating that even though the channel control register contains valid information for an uncompleted load operation, data requested by that uncompleted operation is not needed. This situation arises when a load instruction is overlapped with an instruction which writes to the target register in the register file of the load. Other fields of the channel control register are described in detail in the *Am29000 User's Manual*.

The output of the A multiplexer 814 and the B multiplexer 820 are supplied directly as the register number of lines 44 and 45, respectively, to cause the contents of the address register to be presented at the A and B ports of the register file. The output of the C multiplexer 823 is supplied on line 824 to a data write 1 DW1 register 829. The output of the data write 1 register 829 is supplied on line 830 as the input to data write 2 DW2 register 831. The output of the data write 2 register 831 is the register number on line 46 for writes of data presented at the C port 801 to the designated register in the register file. This has the effect of delaying the register number for writeback of instruction results so that they are presented to the register file during the writeback stage of execution of the instruction.

The output of the A multiplexer on line 828 is coupled to comparator 832 and the output of the B multiplexer 820 on line 827 is coupled to comparator 833. The second input to comparators 832 and 833 is the output of the DW1 register 829 across line 830. These comparators indicate pipeline dependencies that occur when the register number for a source operand as supplied on lines 828, 827 match the destination register for the results of the writeback of the immediately preceding instruction.

In addition, the signals on line 828 are supplied to comparator 834 and the signals on line 827 are supplied to comparator 835. The second input to comparators 834 and 835 is the target register number supplied from the execute level target register 836. The comparators 835 and 834 indicate a pipeline dependency that occurs when one of the register numbers for a source operand presented on lines 828 and 827 matches the target register number of an outstanding load which is loaded in the execute target register 836.

In addition, the output of the DW1 register 829 on line 830 is supplied as one input to comparator 837. The second input to comparator 839 is the target register supplied from the execute target register 836. The output of the comparator 837 indicates a pipeline dependency that occurs when the target register for the load as indicated by the execute target register number 836, is written with the result of an overlapped instruction. When this occurs, the non-needed NN bit in the channel control register, is set. If the comparators determine a match, they also inhibit the writeback of the load data on completion of the load.

The execute target register 836 is loaded across line 838 at the output of the decode stage target register 839.

The decode stage target register is loaded with data across line 828 and used for load multiple and store multiple sequences. The output of the decode target register on line 838 is supplied as one input to the incrementor 818, the output of which is supplied as one input to the A multiplexer 814.

During load multiple and store multiple operation, sequential register numbers are computed by the incrementor 818. In the case of store multiple, the register numbers are supplied as read addresses to the register file by the incrementor. The read addresses are latched by the decode target register 839 so that they can be incremented further. In the case of the load multiple, the target register numbers are held in the execute target register for any other load. However, the execute target register is set with a sequence of incremented addresses in this case.

Figures 10, 10A:
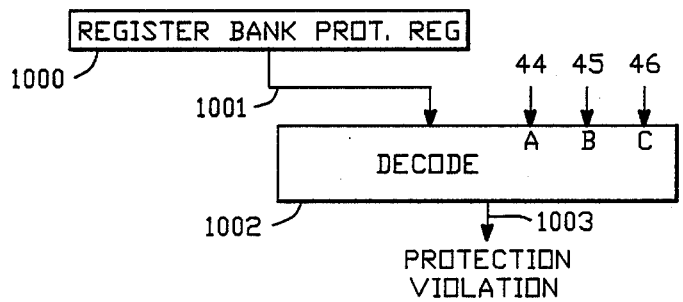
FIG. 10 is a table illustrating the operation of the register bank protect register according to the present invention.
FIG. 10A is a block diagram illustrating operation of the register bank protection register according to the preferred embodiment of the present invention.

As illustrated in FIG. 10, the general purpose registers in the register file 40 are partitioned into 16 banks, each including 16 registers; however, lower banks are unimplemented in the system described in the *Am29000 User's Manual*. Register positions 0 and 1 are not included in bank 0 as they are not, in fact, general purpose registers. A special purpose register in the special purpose register file 54 holds 16 register bank protection bits as indicated in the left hand column of FIG. 10. One bit corresponds to each of the 16 banks of general purpose registers. When the register protection bit for a given bank is 1, attempts accesses to that register as indicated by the register number on line 828 at the output of A multiplexer 814, line 827 at the output of B multiplexer 820, or line 824 at the output of C multiplexer 823, then a register bank protection trap is asserted by the processor. This gives the programmer the ability to restrict access to banks of registers in the register file 40. Register bank protection works only in the user mode and has no effect in the supervisor mode. Note that the protection is based on absolute register numbers; and in the case of local registers, stack pointer addition is performed before protection checking.

FIG. 10A is a schematic representation of the apparatus for detecting protection violations in response to the register bank protect register. The register bank protect register 1000 is a special purpose register as mentioned above, stored in the special purpose register file 54. It is coupled across line 1001 to a decoder 1002. In addition, the file addresses supplied on lines 44, 45 and 46 are supplied to ports A, B and C of the decoder 1002. In the event that one of the file addresses on lines 44, 45 and 46 fall within a bank protected by a corresponding register bank protect register bit, a protection violation signal is generated on line 1003.

Register bank protection is particularly useful for supporting fast context switching in a multitasking processor. By protecting local registers assigned to multiple tasks, task switching time is minimized at the possible expense of an increase in procedure call and procedure execution time. Even so, this trade-off is appropriate in many real time applications.

The 128 local registers, absolute register numbers 128–255, may be partitioned into 8 banks of 16 registers each, with each bank of registers allocated to one of eight tasks resident in the processor. Partitioning can be made transparent to resident tasks because the stack pointer can be set so that the first register in each bank is addressed as local register 0. Even when two or more banks of local registers are mounted into larger banks, each of the larger banks can still start with local register 0 combined with its unique stack pointer.

Since the stack pointer does not affect addressing of global registers, that is, absolute register numbers 2–127, global registers cannot be partitioned among multiple tasks. A task cannot be made to reference the proper global registers unless the registers allocated to a given task are known before execution, but this restriction is too severe in most cases. Global registers should be used, however, to maintain processor state information for the multiple tasks. More details of the context switching operation are provided in the crossreferenced *Am29000 User's Manual*.

IX. Channel Operation

The channel in the preferred embodiment consists of three 32-bit synchronous buses with associated control and status signals, the address bus 21, the data bus 22 and the instruction bus 20. The address bus transfers addresses and control information to devices and memories. The data bus transfers data to and from devices and memories. The instruction bus transfers instructions to the processor from instruction memories. In addition, a set of signals allow control of the channels to be relinquished to an external master.

There are five logical groups of signals performing five distinct functions, with some signals performing more than one function and appearing in more than one group. The five logical groups are as follows:

(1) Address transfer and instruction access requests: AI0-A31, SUP/*US, MPGM0-MPGM1, *PEN, *IREQ, IREQT, *PIA, *BINV.

(2) Instruction Transfer: I0-I31, *IBREQ, *IRDY, *IERR, *IBACK.

(3) Data address transfer and data access requests: A0-A31, R/*W, SUP/*US, *LOCK, MPGM0-MPGM1, *PEN, *DREQ, DREQT0-DREQT1, OPT0-OPT2, *PDA, *BINV.

(4) Data transfer: D0-D31, *DREQ, *DRDY, *DERR, *DBACK, *CDA.

(5) Arbitration: *BREQ, *BGRT, *BINV.

The signals used in these functions are set out below. Other signal inputs to the processor may be determined from a review of the *Am29000 User's Manual*.

| | |
|---|---|
| A0-A31 | Address bus (3-state output, synchronous) The address bus transfers the byte address for all accesses except burst mode accesses. For burst mode accesses, it transfers the address for the first access in the sequence. |
| *BREQ | Bus request (input, synchronous) This input allows other masters to arbitrate for control of the processor channel. |
| *BGRT | Bus grant (output, synchronous) This output signals to an external master that the processor is relinquishing control of the channel in response to *BREQ. |
| *BINV | Bus invalid (output, synchronous) This output indicates that the address bus and related control are invalid. It defines an idle cycle for the channel. |
| R/*W | Read/write (3-state output, synchronous) This signal indicates whether data is being transferred from the processor to the system, or from the system to the processor. |
| SUP/*US | Supervisor/user mode (3-state output, synchronous) This output indicates the program mode for an access. |
| *LOCK | Lock (3-state output, synchronous) This output allows the implementation of |

-continued

| | |
|---|---|
| | various channel and device interlocks. It may be active only for the duration of an access, or active for an extended period of time under control of the lock bit in the current processor status. The processor does not relinquish the channel (in response to *BREQ) when *LOCK is active. |
| MPGM0-synchronous) | MMU programmable (3-state output, MPGM1 These outputs reflect the value of two PGM bits in the translation lookaside buffer entry associated with the access. If no address translation is performed, these signals are both low. |
| *PEN | Pipeline enable (input, synchronous) This signal allows devices which can support pipelined accesses (i.e., which have input latches for the address and required controls) to signal that a second access may begin while the first completes. |
| I0–I31 | Instruction bus (input, synchronous) The instruction bus transfers instructions to the processor. |
| *IREQ | Instruction request (3-state output, synchronous) This signal requests an instruction access. When it is active, the address for the access appears on the address bus. |
| IREQT | Instruction request type (3-state output, synchronous) This signal specifies the address space of an instruction request, when *IREQ is active: |

| IREQT | Meaning |
|---|---|
| 0 | Instruction/data memory access |
| 1 | Instruction read-only memory access. |

| | |
|---|---|
| *IRDY | Instruction ready (input, synchronous) This input indicates that a valid instruction is on the instruction bus. The processor ignores this signal if there is no pending instruction access. |
| *IERR | Instruction error (input, synchronous) This input indicates that an error occurred during the current instruction access. The processor ignores the content of the instruction bus, and an instruction access exception trap occurs if the processor attempts to execute the invalid instruction. The processor ignores this signal if there is no pending instruction access. |
| *IBREQ | Instruction burst request (3-state output, synchronous) This signal is used to establish a burst mode instruction access and to request instruction transfers during a burst mode instruction access. *IBREQ may be active even though the address bus is being used for a data access. This signal becomes valid late in the cycle, with respect to *IREQ. |
| *IBACK | Instruction burst acknowledge (input, synchronous) This input is active whenever a burst mode instruction access has been established. It may be active even though no instructions are currently being accessed. |
| *PIA | Pipelined instruction access (3-state output, synchronous) If *IREQ is not active, this output indicates than an instruction access is pipelined with another, in-progress, instruction access. The indicated access cannot complete until the first access is complete. The completion of the first access is signalled by the assertion of *IREQ. |
| D0–D31 | Data bus (bi-directional, synchronous) The data bus transfers data to and from the processor, for load and store operations. |
| *DREQ | Data request (3-state output, synchronous) This signal requests a data access. When it is active, the address for the access appears on the address bus. |
| DREQT0-synchronous) | Data request type (3-state output, DREQT1 These signals specify the address space of a data access, as follows (the value "x" is don't care): |

| DREQT1 | DREQT0 | Meaning |
|---|---|---|
| 0 | 0 | Instruction/data memory access |
| 0 | 1 | Input/output access |
| 1 | x | Coprocessor transfer |

An interrupt/trap vector request is indicated as a data memory read. If required, the system can identify the vector fetch by the STAT0–STAT2 outputs.

| | |
|---|---|
| *DRDY | Data ready (input, synchronous) For loads, this input indicates that valid data is on the data bus. For stores, it indicates that access is complete and that data need no longer be driven on the data bus. The processor ignores this signal if there is no pending data access. |
| *DERR | Data error (input, synchronous) This input indicates that an error occurred during the current data access. For a load, the processor ignores the content of the data bus. For a store, the access is terminated. In either case, a data access exception trap occurs. The processor ignores this signal if there is no pending data access. |
| *DBACK | Data burst acknowledge (input, synchronous) This input is active whenever a burst mode data access has been established. It may be active even though no data are currently being accessed. |
| *PDA | Pipelined data access (3-state output, synchronous) If *DREQ is not active, this output indicates that a data access is pipelined with another, in-progress data access. The indicated access cannot complete until the first access is complete. The completion of the first access is signalled by the assertion of *DREQ. |
| OPT0–OPT2 | Option Control (3-state output, synchronous) These outputs reflect the value of bits 18-16 of the load or store instruction which begins an access. Bit 18 of the instruction is reflected on OPT2, bit 17 on OPT1, and bit 16 on OPT0. The standard definitions of these signals (based on DREQT) are as follows (the value "x" is don't care): |

| DREQT1 | DREQT0 | OPT2 | OPT1 | OPT0 | Meaning |
|---|---|---|---|---|---|
| 0 | x | 0 | 0 | 0 | Word-length access |
| 0 | x | 0 | 0 | 1 | Byte access |
| 0 | x | 0 | 1 | 0 | Half-word access |
| 0 | x | 0 | 1 | 1 | 24-bit access |
| 0 | 0 | 1 | 0 | 0 | Instruction ROM access (as data reserved) |

If the interpretations above are irrelevant for a particular system, and compatibility issues are not important, other interpretations of the OPT0–OPT2 signals may be used.

| | |
|---|---|
| *CDA | Coprocessor data accept (input, synchronous) This signal allows the coprocessor to indicate the acceptance of operands or operation codes. For transfers to the coprocessor, the processor does not expect a *DRDY response; an active level on *CDA performs the functional normally performed by *DRDY. *CDA may be active whenever the coprocessor is able to accept transfers. |

Instruction accesses occur at one of two spaces: instruction/data memory (14 in FIG. 1), and instruction read-only memory (instruction ROM 15 in FIG. 1). The distinction between these address spaces is made by the IREQT signal, which is in turn derived from the ROM enable RE bit of the current processor status register. These are distinct address spaces; each may be independently populated based on the needs of a particular system.

The instruction/data memory may contain both instructions and data. Although the channel supports separate instruction and data memories, the memory management unit does not. In certain systems, it may be required to access instructions via loads and stores, even though instructions may be contained in physically separate memories. For example, this requirement might be imposed because of the need to load instructions into memory. Note also that the OPT signals may be used to allow the access of instructions in instruction ROM using loads.

Data accesses occur to one of three address spaces: instruction-data memory (14, 16 in FIG. 1), input/output devices or a co-processor. The input/output devices and co-processor are not shown in FIG. 1.

The distinction among these spaces is made by the DREQT0-DREQT1 signals which are in turn determined by the load and store instructions which initiate a data access. Each of these address spaces is distinct.

Data accesses may either pass from memory to the processor (load), or from the processor to memory (store). The direction of the transfer is determined by the R/*W signal. In the case of a load, the processor requires the data on the data bus to be held valid for only a short time before the end of the cycle. In the case of a store, the processor drives the data bus as soon as it becomes available, and holds the data valid until the slave device or memory signals that the access is complete.

Figure 11:
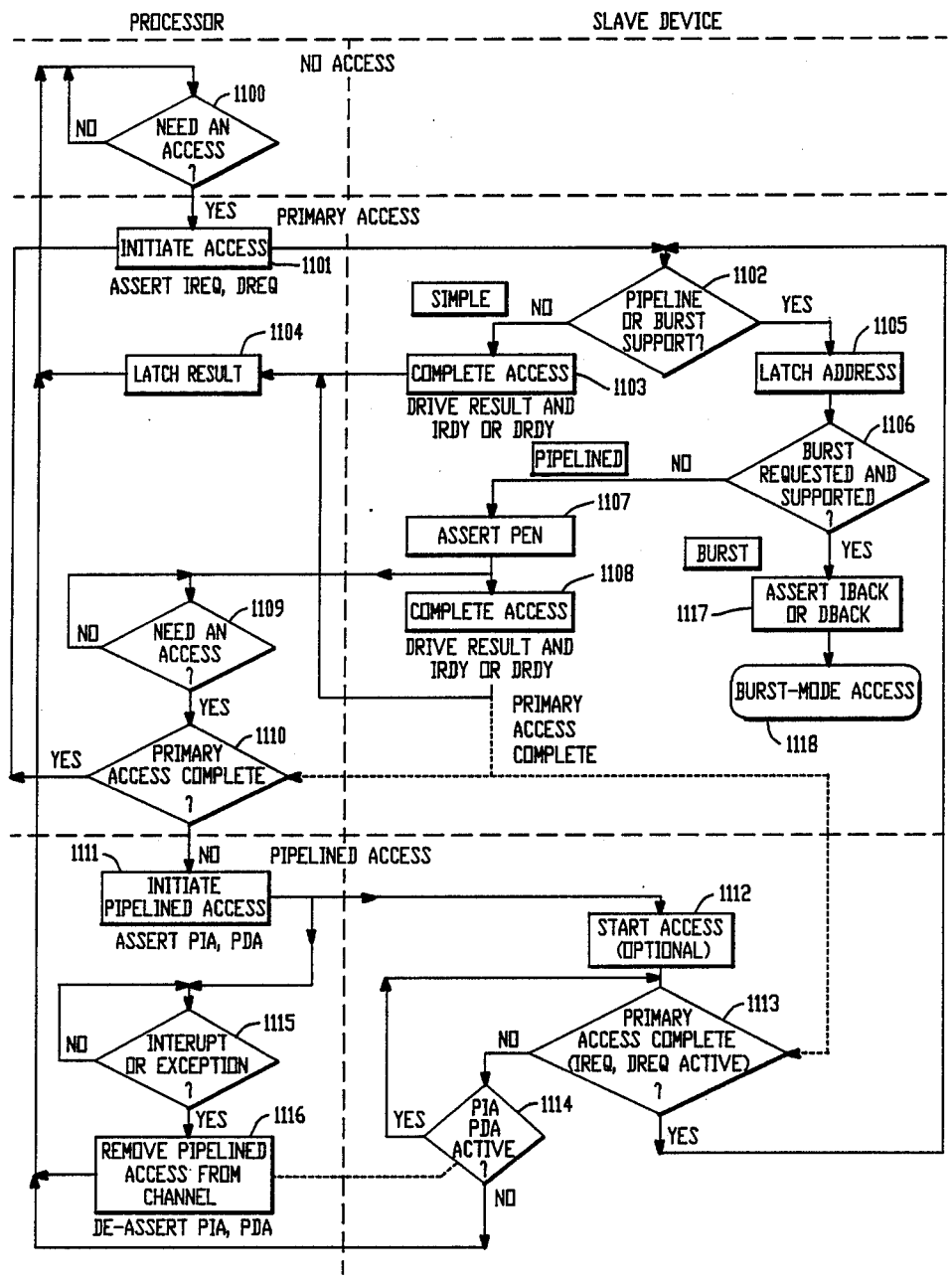
FIG. 11 is a high level flowchart illustrating instruction and data accesses according to the preferred embodiment.

FIG. 11 is a high level control flow chart for accesses performed by the processor. This control process applies independently to both instruction and data accesses.

The processor performs concurrent instruction and data accesses; therefore, these accesses may be at different points in the control flow of FIG. 11 at a given point in time.

The items in the flowchart of FIG. 11 do not represent actual states of the processor and have no particular relationship to processor cycles. The flowchart provides a high level understanding of the control flow necessary for implementation by those skilled in the art. Further, exceptions and error conditions are not shown.

Figure 12:
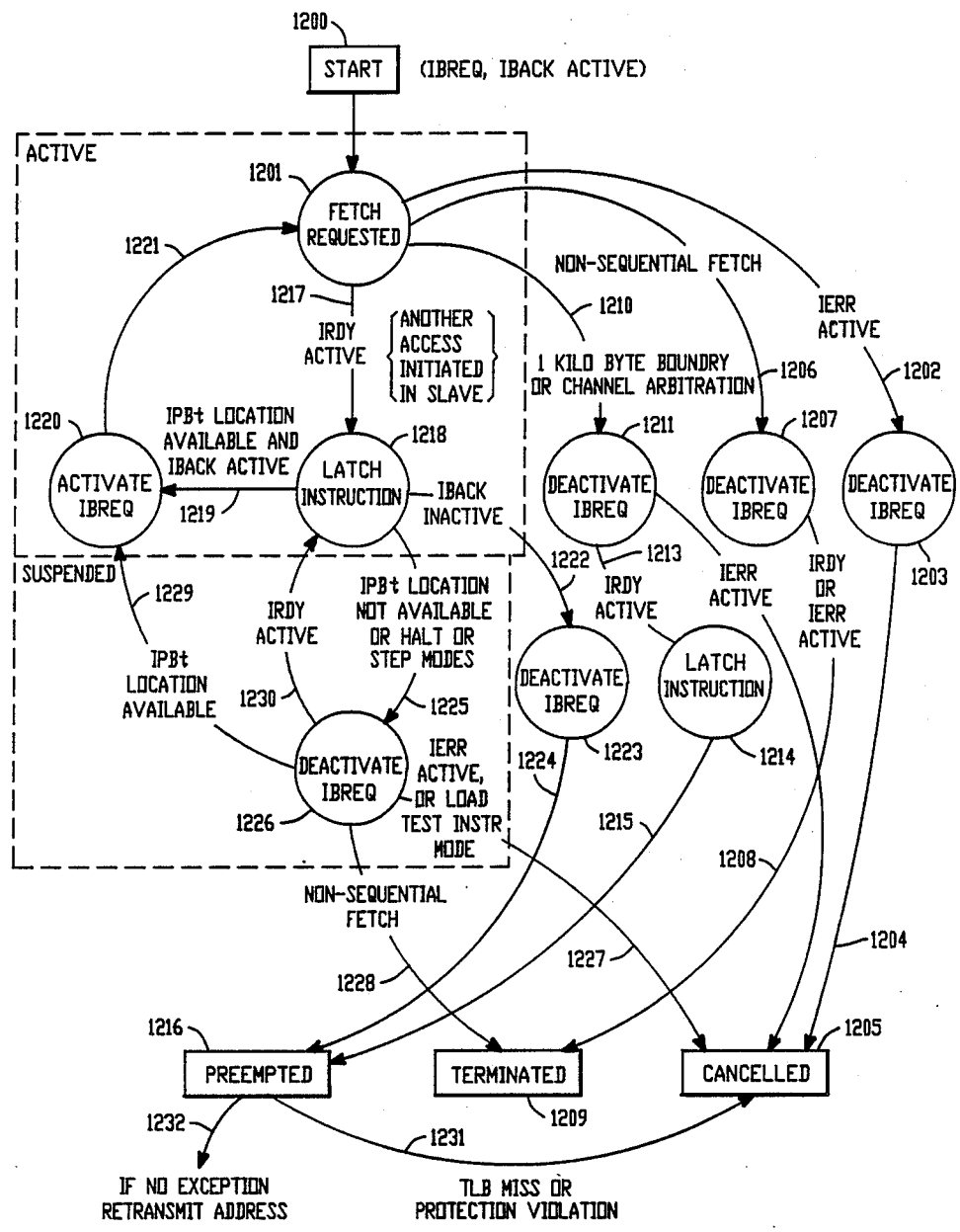
FIG. 12 is a control flow diagram for the processor during burst mode instruction accesses.
Figure 13:
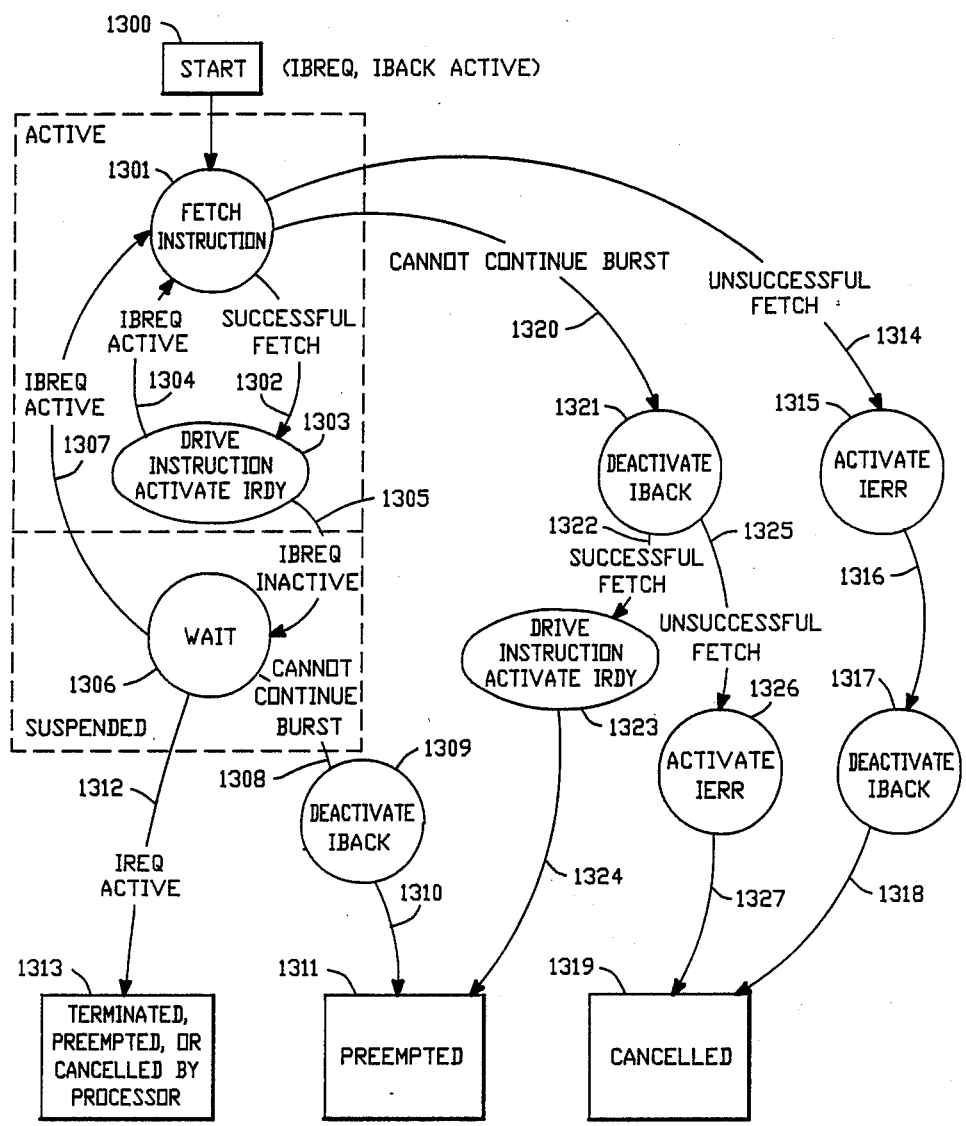
FIG. 13 is a control flow diagram for slave memory device during burst mode instruction accesses.
Figure 14:
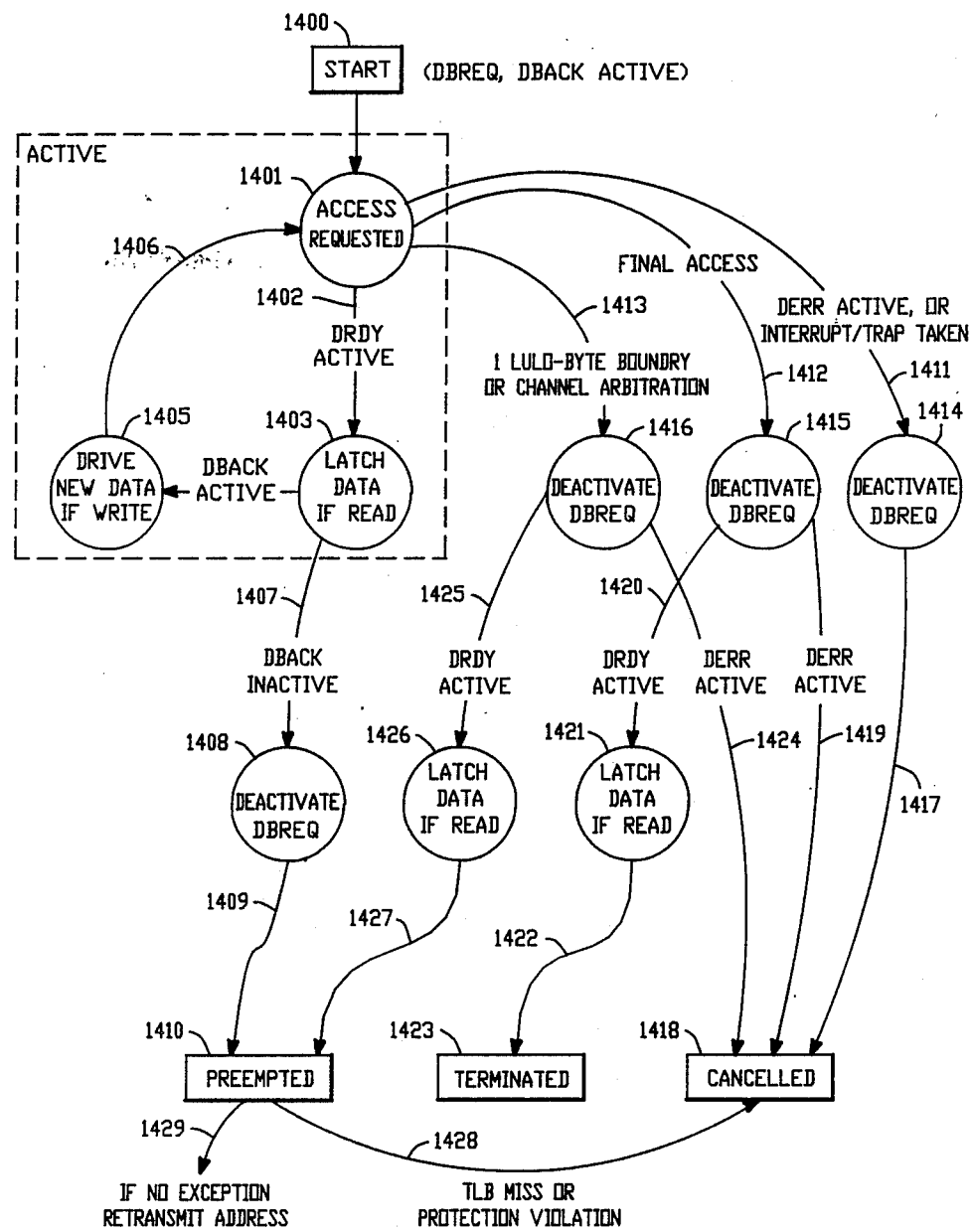
FIG. 14 is a control flow diagram for the processor during burst mode data accesses.

The channel supports three protocols for access: simple, pipelined and burst mode. Simple and pipelined accesses are illustrated in FIG. 11. Burst mode accesses are initiated as illustrated in FIG. 11 and completed as shown in FIGS. 12 through 14.

The processor begins an access in block 1100 when it determines that an access is needed. It initiates the access by asserting an instruction or data request signal (block 1101). The slave device receives the request signal and determines whether pipelined or burst access is supported by the device (block 1102). If neither pipelined nor burst mode is supported, the slave device completes the access by driving the result and *IRDY or *DRDY to the processor (block 1103). The processor latches the result to complete the simple access (block 1104).

If it is determined in block 1102 that pipelined or burst mode is supported, the address is latched (block 1105). The slave device determines whether burst mode is requested and supported (block 1106). If burst mode is not requested or not supported, then a pipeline access is initiated by asserting the *PEN signal (block 1107). The access indicated by the address latched in block 1105 is completed by driving the result and asserting *IRDY or *DRDY (block 1108). The result is latched in block 1104 to complete the first stage of a pipelined access. Upon receipt of the *PEN signal generated in block 1107, the processor determines whether an access is needed prior to completion of the initial access (block 1109). If an access is needed, it is determined whether the primary access is complete (block 1110). If the access is complete in block 1110, the cache access is initiated through block 1101. If the primary access has not completed, a pipelined access is initiated by the processor by asserting *PIA or *PDA (block 1111). The slave device may respond to the initiated pipeline access by starting access operations (block 1112). It then determines whether the primary access is complete (block 1113). If the primary access is not complete, then the slave device determines whether the pipeline access initiation signals remain active (block 1114). If they remain active, it waits in a loop until the primary access is complete and loops to block 1102. This provides overlap access for the pipeline mode.

If, after initiation of a pipeline access in block 1111, an interrupt or exception condition occurs, that state is detected (block 1115). If an interrupt or exception does occur, the pipelined access is removed from the channel by de-asserting the initiation signals (block 1116). In addition, if in block 1114, the initiation signals are deactivated, the pipelined access is not followed through.

If a burst mode is requested and supported in block 1106, the slave device asserts the *IBACK or *DBACK signals (block 1117). A burst mode access is then carried out (block 1118). The processor behaves differently for a burst mode access for instructions than for data, the processor control flow for burst mode instruction accesses is shown in FIG. 12 with the corresponding slave device control flow in FIG. 13.

In block 1112, the slave device may do preparatory functions such as address decoding prior to completion of the primary access. However, the instruction and data buses and associated controls cannot be asserted until the primary access is complete. A burst mode access allows multiple instructions or data words at sequential addresses to be accessed with a single address transfer. The number of accesses performed and the timing of each access within the sequence is controlled dynamically by the burst mode protocol. Burst mode accesses take advantage of sequential addressing patterns and provide several benefits over simple pipeline accesses:

(1) Simultaneous instruction and data accesses. Burst mode accesses reduce utilization of the address bus. This is especially important for instruction accesses which are normally sequential. Burst mode instruction accesses eliminate most of the address transfers for instructions, allowing the address bus to be used for simultaneous data accesses.

(2) Faster access times. By eliminating the address transfer cycle, burst mode accesses allow addresses to be generated in a manner which improves access times.

(3) Faster memory access modes. Many memories have special, high bandwidth access modes (e.g., static, column, page mode and nibble mode). These modes generally require a sequential address pattern even though addresses may not be explicitly presented to the memory for all accesses. Burst mode accesses allow the use of these access modes, without hardware to detect sequential addressing patterns.

A burst mode access may be in one of the following operational conditions at any given time:

(1) Established: the processor and slave device have successfully initiated the burst mode access. A burst mode access which has been established is either active or suspended. An established burst mode access may become preempted, terminated, or cancelled.

(2) Active: Instruction or data accesses and transfers are being performed as the result of the burst mode access. An active burst mode access may become suspended.

(3) Suspended: No accesses or transfers are being performed as the result of the burst mode access, but the burst mode access remains established. Additional accesses and transfers may occur at some later time (i.e., the burst mode access may become active) without the re-transmission of the address for the access.

(4) Preempted: The burst mode access can no longer continue because of some condition, but the burst mode access can be re-established within a short time.

(5) Terminated: All required accesses have been performed.

(6) Cancelled: The burst mode access can no longer continue because of some exceptional condition. The access may be re-established only after the exceptional condition has been corrected, if possible.

Each of the listed conditions, except for the terminated condition, is under control of both the processor and slave device or memory. The terminated condition is determined by the processor, since only the processor can determine that all required accesses have been performed.

FIG. 12 illustrates the control flow for the processor during an instruction burst mode access. The access is activated when both *IBREQ and *IBACK become active (block 1200). The processor generates a fetch request (block 1201). From the fetch request, five transitions may occur. If *IERR is active (line 1202), the *IBREQ signal is deactivated (block 1203). The burst mode access then changes across line 1204 to the cancelled condition (block 1205).

If from block 1201, a non-sequential fetch (i.e., branch) occurs (line 1206), the *IBREQ signal is deactivated (block 1207). If *IRDY or *IERR are active (line 1208), then the access is terminated (block 1209). If from block 1201, a one kilobyte boundary or channel arbitration occurs (line 1210), the IBREQ signal is deactivated (block 1211). From here, if *IERR is active (line 1212), then the access is cancelled (block 1205). Otherwise from block 1211, if *IRDY is active (line 1213), the instruction is latched (block 1214) and the access changes (line 1215) to the preempted condition (1216).

If in block 1201, the *IRDY signal is active (line 1217), the instruction is latched (1218). If an instruction prefetch buffer location is in the available state and *IBACK is active (line 1219), then the processor activates *IBREQ (block 1220). From there, the access continues (line 1221) through a loop back to block 1201. If in block 1218, the *IBACK signal is inactive (line 1222), the processor deactivates *IBREQ (block 1223) and transitions (line 1224) to the preempted condition (block 1216).

If from block 1218, no instruction prefetch buffer is available or halt or step modes of the processor are active (line 1225), the access is suspended and the processor deactivates *IBREQ (block 1226). From block 1226, the access may be cancelled (block 1205), if *IERR becomes active or the load or test instruction modes occur (line 1227). From block 1226 the access may be terminated if a non-sequential fetch occurs (line 1228).

If in block 1226, an instruction prefetch buffer becomes available (line 1229), the access becomes active and the processor activates *IBREQ (block 1220). If in block 1226, the *IRDY signal becomes active (line 1230), the access becomes active and the processor latches the received instruction in block 1218.

A preempted access (block 1216) may become cancelled (block 1205) if a TLB miss or protection violation occurs (line 1231). Further, a preempted access can be restarted by retransmitting the address if no exception occurs (line 1232).

A slave memory during an instruction burst mode access is controlled as shown in FIG. 13. The access starts when *IBREQ and *IBACK are active (block 1300). The active access fetches the requested instruction (block 1301). If the fetch is successful (line 1302), the slave device drives the instruction and activates *IRDY (block 1303). If *IBREQ remains active (line 1304), the active access loops to block 1301 to fetch another instruction. If from block 1303, when the *IBREQ signal is inactive (line 1305), the access is suspended and the slave device waits (block 1306). When *IBREQ becomes active (line 1307), the access is reactivated and an instruction is fetched in block 1301. If, while the slave device is waiting in block 1306, it becomes unable to continue the burst mode access (line 1308), the slave device deactivates *IBACK (block 1309). From block 1309, the access will transition across line 1310 to a preempted condition (block 1311).

If, during block 1306, the *IREQ signal becomes active (line 1312), the access has become terminated, preempted or cancelled by the processor (block 1313).

If, during the fetch performed in block 1301, an unsuccessful fetch occurs (line 1314), the slave device activates *IERR (block 1315). Next, it deactivates *IBACK across line 1316 to block 1317. Finally, from block 1317, the access transitions (line 1318) to the cancelled condition on block 1319.

If, when attempting a fetch from block 1301, the slave device cannot continue the burst mode access (line 1320), the slave device activates *IBACK (block 1321). If the initial fetch is successful (line 1322), the instruction is driven on the bus and *IRDY is activated (block 1323). From block 1323, the access transitions (line 1324) to the preempt condition in block 1311.

If from block 1321, the fetch is unsuccessful (line 1325), the slave device activates *IERR (block 1326) and transitions (line 1327) to the cancelled condition (block 1319).

FIG. 14 illustrates the control flow for a data burst mode request by the processor. The access is started when *DBREQ and *DBACK are active (block 1400). The access becomes active when the access is requested (block 1401). If *DRDY is active after a requested access (line 1402), the processor will latch data if a read access is being performed (block 1403). If *DBACK is active from block 1403 (line 1404), the processor drives new data to the data bus for writes (block 1405). After driving data in block 1405 for writes, the access transitions (line 1406) to block 1401 to continue the burst mode access.

If, during block 1403, the *DBACK signal becomes inactive (line 1407), the processor deactivates *DBREQ (block 1408). From block 1408, the access transitions (line 1409) to the preempted condition (block 1410).

If, from block 1401, the *DERR is active or an interrupt or trap is taken (line 1411), or if the final access of the burst mode access has occurred (line 1412), or if a one kilobyte boundary or channel arbitration function occurs (line 1413), the processor deactivates *DBREQ (blocks 1414, 1415, 1416, respectively).

In block 1414, the access transitions (line 1417) to the cancelled condition (block 1418). If, in block 1415, the *DERR signal is active (line 1419), the access transitions to the cancelled condition (block 1418). If, from block 1415, the *DRDY signal is active (line 1420), the data on the bus is read if a read access is being performed (block 1421). From block 1421, the access transitions (line 1422) to the terminated condition (block 1423).

From block 1416, if the *DERR signal is active (line 1424), the access transitions to the cancelled condition (block 1418). If, from block 1416, the *DRDY signal is active (line 1425), the data is latched for read access (block 1426) and the access transitions (line 1427) to the preempted condition (block 1410). From a preempted condition, the access can be cancelled if a TLB miss or protection violation occurs (line 1428). If no exception exists, a preempted access can be restarted by retransmitting the address (line 1429).

Figure 15:
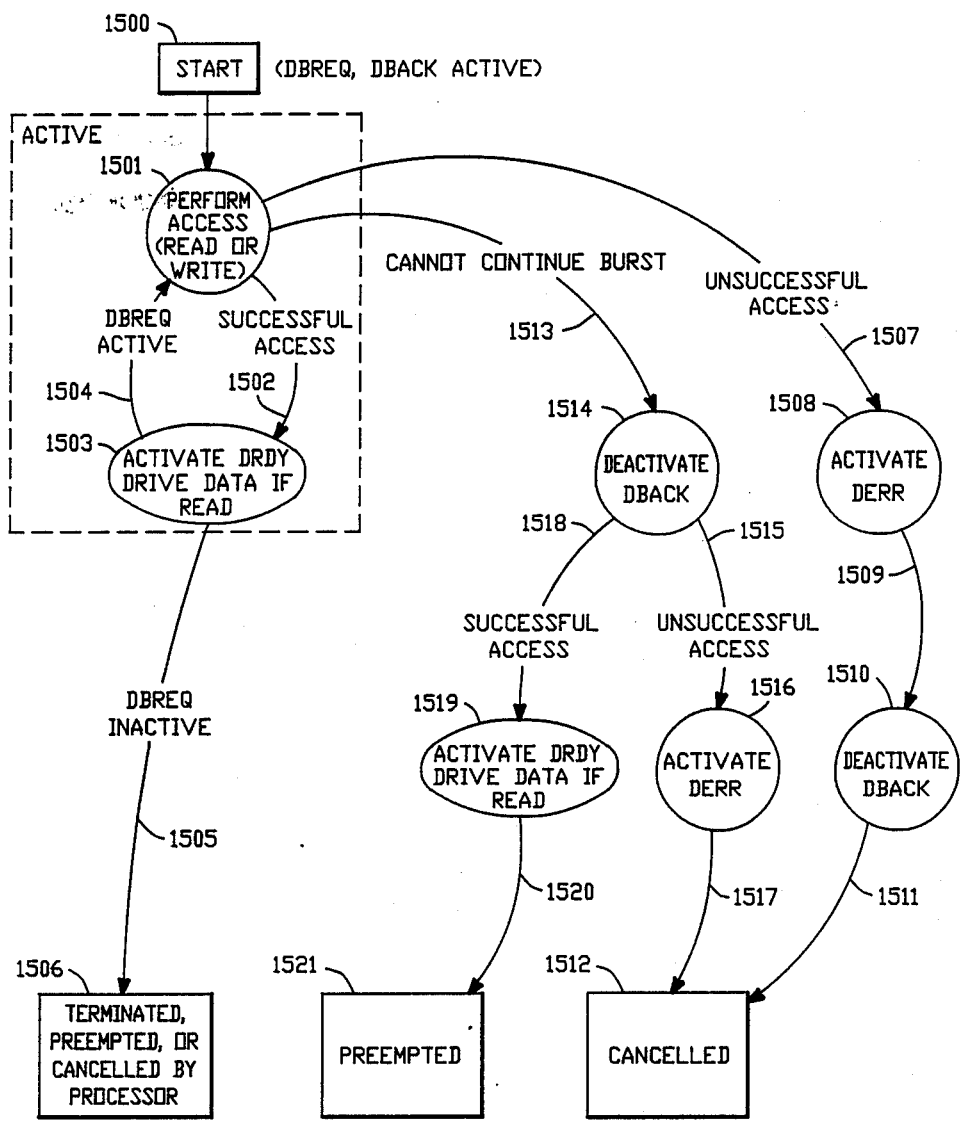
FIG. 15 is a control flow diagram for the slave memory device during burst mode data accesses.

FIG. 15 illustrates the control flow for the slave device during the data burst mode access. The access starts when *DBREQ and *DBACK are active (block 1500). For an active access, the data access is performed for read or write (block 1501). If a successful access occurs (line 1502), the slave activates *DRDY and drives data if a read is occurring (block 1503). If *DBREQ remains active (line 1504), the access loops to block 1501 to continue the burst mode. If, from block 1503, the *DBREQ is detected as inactive (line 1505), the access has been terminated, preempted or cancelled by the processor (block 1506).

If, from block 1501 an unsuccessful access occurs (line 1507), the slave device activates *DERR (block 1508). The slave device then transitions (line 1509) to deactivate *DBACK (block 1510). From block 1510, the access transitions (line 1511) to the cancelled condition (block 1512).

If, from block 1501, the slave device cannot continue the burst access (line 1513), then it deactivates *DBACK (block 1514). If an unsuccessful access has occurred (line 1515), the slave device activates *DERR (block 1516) and the access transitions (line 1517) to the cancelled condition (block 1512).

If, from block 1514, a successful access occurs (line 1518), the slave device activates *DRDY and drives data for a read (block 1519). From block 1519 the access transitions on line 1520 to a preempted condition (block 1521).

The slave devices may typically fail to continue a burst mode access (lines 1513 or 1320) when an implementation dependent address boundary is encountered, for example, in a cache block boundary. However, this may occur for any reason.

Note that the processor supports a suspended condition for burst mode accesses of instructions and not for data.

CONCLUSION

The present invention provides an architecture for a streamlined instruction processor optimized to operate at the maximum instruction execution rate a significant portion of the time. This architecture is characterized by a branch target cache, a register file incorporating stack pointer addressing and register bank protection and a system channel incorporating the unique three-bus interface supporting burst-mode accesses.

The present invention is particularly suitable for reduced instruction-set processors such as the Am29000 described in the cross-referenced *Am29000 User's Manual*. This architecture optimizes the data flow structure and provides performance-enhancing features dedicated to achieving an average instruction-execution rate which is close to one instruction per cycle.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for processing data in response to a program composed of prespecified instructions in pipeline cycles, the data being stored in locations in a data memory addressed by data addresses and instructions being stored in locations in an instruction memory addressed by instruction addresses, and wherein instructions include file address field identifying sources of operand data and destinations for result data, the apparatus comprising:

channel means for transferring addresses and data to the instruction and data memories (14,15,16) and for receiving data and instructions from the data and instruction memories, including an instruction interface (20) adapted for receiving instructions from the instruction memory, a data interface (22) adapted for communicating data between the apparatus and the data memory, and an address interface (21) adapted for supplying data addresses to the data memory and instruction addresses to the instruction memory;

program addressing means (31), responsive to the program, for supplying a sequential instruction address or a non-sequential instruction address for an instruction to be executed according to the program;

buffering means (26), coupled to receive instructions from the instruction interface and to the program addressing means, for buffering a sequence of instructions supplied to the instruction interface in buffer locations accessible in response to the sequential instruction address supplied by the program addressing means;

caching means (29) coupled to the program addressing means, for storing sets of instructions in blocks of cache locations identified by a field in the instruction addresses and accessible in response to the non-sequential instruction address supplied by the program addressing means, the sets including instructions retrieved from sequential locations in the instruction memory, and a first instruction in each set being a target instruction of a non-sequential instruction address;

instruction register means (27), coupled to buffering means and the caching means, for staging under program control an instruction accessed from the buffering means or the caching means in response to the sequential or non-sequential instruction address, respectively, supplied by the program addressing means;

storage means (40) for storing data in a file of data locations identified by file addresses, the storage means including at least two read ports (A,B) and at least one write port (C), the read ports including means connected to receive file addresses in pipeline cycles for supplying data at the read port from data locations identified by the received file addresses, and the write port connected to receive data and including means connected to receive file addresses in pipeline cycles for writing data received at the write port to data locations identified by the received file addresses;

file addressing means (43), coupled to receive file address field of the instructions staged from the instruction register means and to the storage means, for supplying file addresses identified by the file address field to the read ports and the write port under program control;

executing means (42), responsive to the instructions staged from the instruction register means in pipeline cycles and coupled to the read ports, for executing the instructions and generating resulting data;

result register means (53), coupled to supply data to the write port and connected to the executing means, for staging the resulting data.

2. The apparatus of claim 1, further including:
prefetching means (25), coupled to the address interface and the caching means, for generating a starting address for a transfer of instructions having sequential instruction addresses for supply to the instruction interface and wherein, if the target instruction of the non-sequential instruction address is not stored in the caching means, the starting address being the non-sequential instruction address supplied by the program addressing means, and if the target instruction of the non-sequential address is stored in the caching means, the starting address is calculated by adding an offset to the non-sequential instruction address supplied by the program addressing means.

3. The apparatus of claim 2, wherein the instruction memory is organized in pages characterized by page boundary crossing addresses, and page boundary crossing addresses are treated as non-sequential addresses by the caching means and the prefetching means.

4. The apparatus of claim 2, wherein the offset is equal to the number of instructions stored in a set of cache locations.

5. The apparatus of claim 1, wherein the file addressing means further includes:
stack pointer means (806) for storing a stack pointer having a pointer value modifiable under program control; and means (811,812,813) for generating the file addresses in response to the file address field supplied by instructions and to the value of the stack pointer.

6. The apparatus of claim 5, wherein the means for generating file addresses includes:
first means (811), coupled to receive a first file address field from the instruction staged by the instruction register means and to receive the stack pointer, for combining the first file address field and the stack pointer to generate a first stack file address;

first selecting means (814), coupled to receive the first stack file address and the first file address field, for selecting under program control the first stack file address or the first file address field for supply as a file address to a first read port;

second means (812), coupled to receive a second file address field from the instruction staged by the instruction register means and to receive the stack pointer, for combining the second file address field and the stack pointer to generate a second stack file address;

second selecting means (820), coupled to receive the second stack file address and the second file address field, for selecting under program control the second stack file address or the second file address field for supply as a file address to a second read port;

third means (813), coupled to receive a third file address field from the instruction staged by the instruction register means and to receive the stack pointer, for combining the third file address field and the stack pointer to generate a third stack file address; and third selecting means (823), coupled to receive the third stack file address and the third file address field, for selecting under program control the third stack file address or the third file address field for supply as a file address to a write port.

7. The apparatus of claim 5, wherein the file of data locations in the storage means includes a first subset of local data locations and a second subset of global data locations, and wherein the means for generating file addresses is responsive to the stack pointer in generation of file addresses identifying locations within the first subset.

8. The apparatus of claim 5, wherein the stack pointer means comprises a location in the storage means accessible in response to a prespecified file address (Reg. No. 1) for storing the stack pointer.

9. The apparatus of claim 1, wherein the file addressing means further includes:
indirect pointer means (807,808,809) for storing an indirect pointer indicating a file address modifiable under program control; and means (814,820,823) for supplying the indirect pointer as a file address for access to the storage means.

10. The apparatus of claim 9, wherein the indirect pointer means comprises a location in the storage means accessible in response to a prespecified file address (Reg. No. 0) for storing the indirect pointer.

11. The apparatus of claim 6, wherein the file addressing means further includes:
indirect pointer means (807) for storing an indirect pointer indicating a file address modifiable under program control; and wherein the first selecting means (814) is further coupled to receive the indirect pointer for selecting the indirect pointer, the first stack file address or the first file address field as the file address to the first read port.

12. The apparatus of claim 6, wherein the file addressing means further includes:
   first indirect pointer means (807) for storing a first indirect pointer indicating a file address modifiable under program control;
   second indirect pointer means (808) for storing a second indirect pointer indicating a file address modifiable under program control;
   third indirect pointer means (809) for storing a third indirect pointer indicating a file address modifiable under program control; and wherein
   the first selecting means (814) is further coupled to receive the first indirect pointer for selecting the first indirect pointer, the first stack file address or the first file address field as the file address to the first read port;
   the second selecting means (820) is further coupled to receive the second indirect pointer for selecting the second indirect pointer, the second stack file address or the second file address field as the file address to the second read port; and
   the third selecting means (823) is further coupled to receive the third indirect pointer for selecting the third indirect pointer, the third stack file address or the third file address field as the file address to the write port.

13. The apparatus of claim 12, wherein:
   the first selecting means is responsive to a prespecified file address in the first file address field (15-8) to select the first indirect pointer means;
   the second selecting means is responsive to a prespecified file address in the second file address field (7-0) to select the second indirect pointer means; and
   the third selecting means is responsive to a prespecified file address in the third file address field (23-16) to select the third indirect pointer means.

14. The apparatus of claim 1, wherein the locations in the storage means are grouped in a plurality of banks, and further including:
   bank protection means (1000) for storing a bank protection code indicating a bank or banks of locations protected from access in response to the instructions staged from the instruction register means, the bank protection code being modifiable under program control; and
   means (1002), responsive to the bank protection code and the file addresses supplied by the file addressing means, for generating a protection violation signal upon attempted access of a protected bank.

15. The apparatus of claim 1, further including:
   means (41), coupled to the program addressing means and responsive to instructions staged from the instruction register means, for generating non-sequential instruction addresses.

16. The apparatus of claim 1, wherein the instruction interface (20), data interface (22) and address interface (21) comprise separate, non-multiplexed buses.

17. The apparatus of claim 1, wherein the caching means further includes a plurality of tag locations, one tag location associated with each set and storing information identifying the target instruction in the associated set and validity of instructions in the associated set; and
   means (510,511,514), coupled to the program addressing means and to the tag locations, for enabling access to the sets of cache locations in response to a non-sequential address.

18. The apparatus of claim 17, further including:
   prefetching means (25), coupled to the address interface, the program addressing means and the caching means, for generating a starting address for supply to the address interface for a transfer of instructions having sequential instruction addresses to be supplied to the instruction interface and wherein, if the target instruction of the non-sequential instruction address is not stored n the caching means as the first instruction in a set of instructions in one of the sets of cache locations, the starting address being the non-sequential instruction address supplied by the program addressing means, and if the target instruction of the non-sequential address is stored in the caching means as the first instruction in a set of instruction in one of the sets of cache locations and all of the instructions in the one set are valid, the starting address is calculated by adding an offset to the non-sequential instruction address supplied by the program addressing means.

19. The apparatus of claim 18, wherein the offset is equal to the number of instruction stored in a set of cache locations.

20. The apparatus of claim 18, wherein the instruction memory is organized in pages characterized by page boundary crossing addresses, and page boundary crossing addresses are treated as non-sequential addresses by the caching means and the prefetching means.

21. The apparatus of claim 1, wherein the instruction memory is organized in pages characterized by page boundary crossing addresses, and page boundary crossing addresses are treated as non-sequential addresses by the caching means.

22. An apparatus for processing data in response to a program composed of prespecified instructions in pipeline cycles, the data being stored in locations in a data memory addressed by data addresses and instructions being stored in locations in an instruction memory addressed by instruction addresses, and wherein instruction include file address fields identifying sources of operand data and destinations for result data, the apparatus comprising:
   channel means for transferring addresses and data to the instruction and data memories (14,15,16) and for receiving data and instructions from the data and instruction memories, including an instruction interface (20) adapted for receiving instructions from the instruction memory, a data interface (22) adapted for communicating data between the apparatus and the data memory, and an address interface (21) adapted for supplying data addresses to the data memory and instruction addresses to the instruction memory;
   program addressing means (31), responsive to the program, for supplying a sequential instruction address or a non-sequential instruction address for an instruction to be executed according to the program;
   fetching means (23), coupled to the program addressing means and to the instruction interface, for supplying instructions in response to the sequential or non-sequential instruction address supplied by the program addressing means;

instruction register means (27), coupled to fetching means, for staging under program control an instruction supplied by fetching means;

storage means (40) for storing data in a file of data locations identified by file addresses, the storage means including at least two read ports (A,B) and at least one write port (C), the read ports including means connected to receive file addresses in pipeline cycles for supplying data at the read port from data locations identified by the received file addresses, and the write port connected to receive data and including means connected to receive file addresses in pipeline cycles for writing data received at the write port to data locations identified by the received file addresses;

file addressing means (43), coupled to receive file address fields of the instructions staged from the instruction register means and to the storage means, for supplying file addresses to the read ports and the write port under program control, including stack pointer means (806) for storing a stack pointer having a pointer value modifiable under program control, and means (811,812,813) for generating the file addresses in response to the file address field supplied by instruction and to the value of the stack pointer;

executing means (42), responsive to the instructions staged from the instruction register means in pipeline cycles and coupled to the read ports, for executing the instructions and generating resulting data;

result register means (53), coupled to supply data to the write port and connected to the executing means, for staging the resulting data.

23. The apparatus of claim 22, wherein the means for generating file addresses includes:

first means (811), coupled to receive a first file address field from the instruction staged by the instruction register means and to receive the stack pointer, for combining the first file address field and the stack pointer to generate a first stack file address;

first selecting means (814), coupled to receive the first stack file address and the first file address field, for selecting under program control the first stack file address or the first file address field for supply as a file address to a first read port;

second means (812), coupled to receive a second file address field from the instruction staged by the instruction register means and to receive the stack pointer, for combining the second file address field and the stack pointer to generate a second stack file address;

second selecting means (820), coupled to receive the second stack file address and the second file address field, for selecting under program control the second stack file address or the second file address field for supply as a file address to a second read port;

third means (813), coupled to receive a third file address field from the instruction staged by the instruction register means and to receive the stack pointer, for combining the third file address field and the stack pointer to generate a third stack file address; and third selecting means (823), coupled to receive the third stack file address and the third file address field, for selecting under program control the third stack file address or the third file address field for supply as a file address to a write port.

24. The apparatus of claim 22, wherein the file addressing means further includes:

indirect pointer means (807,808,809) for storing an indirect pointer indicating a file address modifiable under program control; and means (814,820,823) for supplying the indirect pointer as a file address for access to the storage means.

25. The apparatus of claim 23, wherein the file addressing means further includes:

indirect pointer means (807) for storing an indirect pointer indicating a file address modifiable under program control; and wherein the first selecting means (814) is further coupled to receive the indirect pointer for selecting the indirect pointer, the first stack file address or the first file address field as the file address to the first read port.

26. The apparatus of claim 23, wherein the file addressing means further includes:

first indirect pointer means (807) for storing a first indirect pointer indicating a file address modifiable under program control;

second indirect pointer means (808) for storing a second indirect pointer indicating a file address modifiable under program control;

third indirect pointer means (809) for storing a third indirect pointer indicating a file address modifiable under program control; and wherein the first selecting means (814) is further coupled to receive the first indirect pointer for selecting the first indirect pointer, the first stack file address or the first file address field as the file address to the first read port;

the second selecting means (820) is further coupled to receive the second indirect pointer for selecting the second indirect pointer, the second stack file address or the second file address field as the file address to the second read port; and the third selecting means (823) is further coupled to receive the third indirect pointer for selecting the third indirect pointer, the third stack file address or the third file address field as the file address to the write port.

27. The apparatus of claim 13, wherein:

the first selecting means is responsive to a prespecified file address in the first file address field to select the first indirect pointer means;

the second selecting means is responsive to a prespecified file address in the second file address field (7-0) to select the second indirect pointer means; and the third selecting means is responsive to a prespecified file address in the third file address field (23-16) to select the third indirect pointer means.

28. The apparatus of claim 22, wherein the locations in the storage means are grouped in a plurality of banks, and further including:

bank protection means (1000) for storing a bank protection code indicating a bank or banks of locations protected from access in response to the instructions staged from the instruction register means, the bank protection code being modifiable under program control; and means (1002), responsive to the bank protection code and the file addresses supplied by the file addressing means, for generating a protection violation signal upon attempted access of a protected bank.

29. The apparatus of claim 22, wherein the instruction interface (20), data interface (22) and address interface (21) comprise separate, non-multiplexed buses.

30. The apparatus of claim 5, wherein the file of data locations in the storage means includes a first subset of local data locations and a second subset of global data locations, and wherein the means for generating file addresses is responsive to the stack pointer in generation of file addresses identifying locations within the first subset.

31. The apparatus of claim 22, wherein the stack pointer means comprises a location in the storage means accessible in response to a prespecified file address (Reg. No. 1) for storing the stack pointer.

32. The apparatus of claim 24, wherein the indirect pointer means comprises a location in the storage means accessible in response to a prespecified file address (Reg. No. 0) for storing the indirect pointer.

33. The apparatus of claim 22, wherein the fetching means includes:

buffering means (26), coupled to receive instructions from the instruction interface and to the program addressing means, for buffering a sequence of instructions supplied to the instruction interface in buffer locations accessible in response to the sequential instruction address supplied by the program addressing means;

caching means (29), coupled to the program addressing means, for storing sets of instructions in blocks of cache locations identified by a field in the instruction addresses and accessible in response to the non-sequential instruction address supplied by the program addressing means, the sets including instructions retrieved from sequential locations in the instruction memory, and a first instruction in each set being a target instruction of a non-sequential instruction address.

34. The apparatus of claim 33, further including:

prefetching means (25), coupled to the address interface and the caching means, for generating a starting address for a transfer of instructions having sequential instruction addresses for supply to the instruction interface and wherein, if the target instruction of the non-sequential instruction address is not stored in the caching means, the starting address being the non-sequential instruction address supplied by the program addressing means, and if the target instruction of the non-sequential address is stored in the caching means, the starting address is calculated by adding an offset to the non-sequential instruction address supplied by the program addressing means.

35. The apparatus of claim 34, wherein the instruction memory is organized in pages characterized by page boundary crossing addresses, and page boundary crossing addresses are treated as non-sequential addresses by the caching means and the prefetching means.

36. The apparatus of claim 33, wherein the caching means further includes a plurality of tag locations, one tag location associated with each set and storing information identifying the target instruction in the associated set and validity of instructions in the associated set; and means (510,511,514), coupled to the program addressing means and to the tag locations, for enabling access to the sets of cache locations in response to a non-sequential address.

37. The apparatus of claim 36, further including:

prefetching means (25), coupled to the address interface, the program addressing means and the caching means, for generating a starting address for supply to the address interface for a transfer of instructions having sequential instruction addresses to be supplied to the instruction interface and wherein, if the target instruction of the non-sequential instruction address is not stored n the caching means as the first instruction in a set of instructions in one of the sets of cache locations, the starting address being the non-sequential instruction address supplied by the program addressing means, and if the target instruction of the non-sequential address is stored in the caching means as the first instruction in a set of instruction in one of the sets of cache locations and all of the instructions in the one set are valid, the starting address is calculated by adding an offset to the non-sequential instruction address supplied by the program addressing means.

38. The apparatus of claim 37, wherein the offset is equal to the number of instruction stored in a set of cache locations.

39. The apparatus of claim 33, wherein the instruction memory is organized in pages characterized by page boundary crossing addresses, and page boundary crossing addresses are treated as non-sequential addresses by the caching means.

40. The apparatus of claim 37, wherein the instruction memory is organized in pages characterized by page boundary crossing addresses, and page boundary crossing addresses are treated as non-sequential addresses by the caching means and the prefetching means.

* * * * *

UNITED STATES PATENT AND TRADEMARK OFFICE
CERTIFICATE OF CORRECTION

PATENT NO.  : 4,926,323

DATED       : May 15, 1990

INVENTOR(S) : Gigy Baror, et al.

It is certified that error appears in the above-identified patent and that said Letters Patent is hereby corrected as shown below:

Column 1, line 22, after "by" and before "et", is "Brian W. Case", which should be deleted and --William Michael Johnson-- should be inserted.

Column 1, line 36, after "Johnson" and before ".", "et al" should be deleted.

Signed and Sealed this

Third Day of September, 1991

Attest:

HARRY F. MANBECK, JR.

Attesting Officer

Commissioner of Patents and Trademarks